United States Patent [19]

Sasaki et al.

[11] Patent Number: 4,774,166

[45] Date of Patent: Sep. 27, 1988

[54] METHOD FOR THE FORMATION OF COLOR IMAGES USING A COLOR DEVELOPER NOT SUBSTANTIALLY CONTAINING BENZYL ALCOHOL

[75] Inventors: Minoru Sasaki; Tadahisa Sato; Nobuo Furutachi; Takeshi Hirose, all of Kanagawa, Japan

[73] Assignee: Fuji Photo Film Co., Ltd., Kanagawa, Japan

[21] Appl. No.: 7,864

[22] Filed: Jan. 28, 1987

[30] Foreign Application Priority Data

Jan. 29, 1986 [JP] Japan ..................................... 61-18750

[51] Int. Cl.[4] ................................................ G02C 7/00

[52] U.S. Cl. .................................... 430/376; 430/380; 430/384; 430/386; 430/434; 430/464; 430/467; 430/476; 430/487; 430/546

[58] Field of Search ............... 430/372, 376, 377, 487, 430/384, 385, 386, 387, 380, 385, 546, 434, 464, 467, 476

[56] References Cited

U.S. PATENT DOCUMENTS

| | | | |
|---|---|---|---|
| 2,322,027 | 6/1943 | Jelley et al. | 430/546 |
| 3,996,054 | 12/1976 | Santemma et al. | 430/377 |
| 4,464,464 | 8/1984 | Matejec et al. | 430/546 |
| 4,622,287 | 11/1986 | Umemoto et al. | 430/505 |

FOREIGN PATENT DOCUMENTS

| | | | |
|---|---|---|---|
| 158446 | 8/1985 | Japan | 430/377 |

*Primary Examiner*—Paul R. Michl
*Assistant Examiner*—Patrick A. Doody
*Attorney, Agent, or Firm*—Sughrue, Mion, Zinn, Macpeak & Seas

[57] ABSTRACT

A method for the formation of a color image is described, wherein a silver halide color photographic material comprising a photographic layer provided on a reflective support is imagewise exposed and then subjected to development for a period of time within 2 minutes and 30 seconds with a color developer which contains an aromatic primary amine developing agent but does not substantially contain benzyl alcohol, wherein said photographic layer contains at lesat one specific non-coloring coloration accelerator selected from the group consisting of compounds represented by formulae (I) through (VII) defined in the specification.

18 Claims, No Drawings

METHOD FOR THE FORMATION OF COLOR IMAGES USING A COLOR DEVELOPER NOT SUBSTANTIALLY CONTAINING BENZYL ALCOHOL

FIELD OF THE INVENTION

The present invention relates to a method for the formation of color images in silver halide color photographic materials, and in particular to using improved coloration accelerators for color couplers without the use of benzyl alcohol for the reduction of processing time.

BACKGROUND OF THE INVENTION

Silver halide color photographic materials typically have a multi-layer constitutional light-sensitive film, coated on a support, comprising three kinds of silver halide emulsion layers selectively sensitized so that the layers have light-sensitivity, usually, to blue-light, green-light, and red-light, respectively. For instance, a so-called color photographic paper (hereinafter referred to as "color paper") generally has a red-sensitive emulsion layer, a green-sensitive emulsion layer and a blue-sensitive emulsion layer coated on a support in in the order listed on the side to be exposed to light, and, in addition, color-stain preventive or ultraviolet absorptive intermediate layers, protective layers and the like are provided between the light-sensitive layers and so on.

For the formation of color photographic images, photographic couplers for three colors of yellow, cyan and magenta are incorporated in the light-sensitive layers, and the photographic materials are, after having been exposed to light, subjected to color development with a so-called color developer. The coupling reaction between the oxidation product of an aromatic primary amine and the coupler results in the formation of colored dyes; and the coupling speed in the reaction is preferably as high as possible, and the couplers are preferred to have a higher colorability so as to obtain a higher color density within the limited developing time. Moreover, the colored dyes are required to be sharp cyan, magenta, and yellow dyes, individually, with less side-absorption and to form color photographic images of good color-reproductivity.

In addition, the cyan-, magenta- and yellow-couplers are required to be fixed individually to the respective silver halide emulsion layers each having a selective sensitivity to blue, green, or red light to prevent color stain. Therefore, the couplers to be used in practice are to have a long-chain aliphatic group in the molecule as a diffusion-resistant group.

In the practical use of such couplers having an oleophilic diffusion-resistant group, in general, so-called oil-soluble couplers have heretofore been proposed, which are dissolved in a high-boiling point or low-boiling point organic solvents; and the resulting coupler solution is emulsified, dispersed and incorporated into an emulsion layer. The use of such couplers, however, is accompanied by difficult problems, such as that the color developing agent hardly penetrates into the coupler dispersion-containing oil drops, the said agent has a poor oleophilic property, and that the colored density is low. Under the circumstances, various kinds of developing agent penetrating accelerator have been investigated. In particular, the addition of benzyl alcohol to color developers for the acceleration of the color development has heretofore been widely utilized for the processing of color photographic materials, in particular, color papers, as the coloration-accelerating effect by the addition of benzyl alcohol is remarkable.

However, the use of benzyl alcohol requires diethylene glycol, triethylene glycol or alkanolamines as a solvent, since the benzyl alcohol has a poor water-solubility. These compounds including benzyl alcohol have high BOD (biochemical oxygen demand) and COD (chemical oxygen demand) values, which are environmental pollution load values, and therefore, the use of benzyl alcohol is preferably avoided in view of the purpose for the reduction of the environmental pollution load.

Moreover, even though the said solvents are used, the dissolution of benzyl alcohol in said solvents requires much time, and therefore, the use of benzyl alcohol is better avoided from the viewpoint of the purpose for the reduction of the load in the preparation of photographic processing solutions.

Further, if benzyl alcohol is brought into a bleaching bath or bleaching-fixation bath, which is a post-bath after the developing bath, this will result in the formation of a leuco dye of a cyan dye, causing the decrement of the colored density. In addition, the use of benzyl alcohol causes retardation of the speed for the washing-out of developer components, which often have a bad influence on the image preservation-stability of processed photographic materials. Accordingly, benzyl alcohol is preferably not used in view of the above-mentioned reasons.

Color development is, in general, completed within 3 to 4 minutes in conventional means, and recently, the reduction of the processing time is being required along with the reduction of the time limit for the delivery of commercial color prints and with the reduction of the working load in the development laboratory.

Despite such situation, the elimination of benzyl alcohol, which is a coloration-accelerator, and the reduction of the developing time, tend to cause a noticeable deterioration of the colored density.

In order to solve these problems, various other kinds of color development-accelerators (for example, compounds as described in U.S. Pat. Nos. 2,950,970, 2,515,147, 2,496,903, 2,304,925, 4,038,075 and 4,119,462, British Pat. Nos. 1,430,998 and 1,355,413, Japanese Patent Application (OPI) Nos. 15831/78, 62450/80, 62451/80, 62452/80, 62453/80, 50536/83 and 162256/85 (the term "OPI" as used herein means an "unexamined and published application"), Japanese Patent Publication Nos. 12422/76 and 49728/80) have heretofore been co-used together with various color developers, but fully satisfactory color density has not been obtained as yet.

The incorporation of color developing agents into photographic materials (for example, as described in U.S. Pat. Nos. 3,719,482, 3,342,559 and 3,342,597, Japanese Patent Application (OPI) Nos. 6235/81, 16133/81, 97531/82 and 83565/82) also is defective in that the speed of the color development is lowered and fog occurs, and this is not proper.

The use of silver chloride emulsions (for example, as described in Japanese Patent Application (OPI) Nos. 95345/83, 242342/84 and 19140/85) is not fully practical, since the occurrence of fog is noticeable.

Despite much work in this area, a method for the formation of fully sufficient color images in a short period of time by using color developers which do not substantially contain benzyl alcohol has not yet been found.

SUMMARY OF THE INVENTION

Accordingly, the object of the present invention is to provide a method for the formation of color images, in a short period of time, by processing color photographic materials containing at least one oil-soluble coupler with color developers which do not substantially contain benzyl alcohol while the colorability of the coupler is elevated.

The object of the present invention can be achieved by a method for the formation of color images, wherein a silver halide color photographic material comprising a photographic layer provided on a reflective support is imagewise exposed and then subjected to development for a period of time within 2 minutes and 30 seconds with a color developer which contains an aromatic primary amine developing agent but does not substantially contain benzyl alcohol, wherein said photographic layer contains at least one non-coloring compound selected from the group consisting of compounds of the following formulae (I) through (VII).

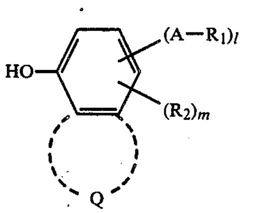

(I)

$HOOC-R_3$ (II)

$Y_1-O-(R_4'-O)_n-R_4$ (III)

$R_5-NHSO_2-R_6$ (IV)

$R_7-CONHCO-R_8$ (V)

(VI)

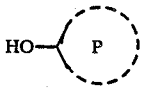

$HO-R_9$ (VII)

wherein

A represents a divalent electron attrative group; $R_1$ represents an alkyl group, an aryl group, an alkoxy group, an aryloxy group, an alkylamino group, an anilino group or a heterocyclic group; l represents an integer of 1 or 2; $R_2$ represents an alkyl group, an alkoxy group, a hydroxyl group or a halogen; m represents an integer of 0 to 4; Q represents a benzene ring or a hetero ring which may be condensed with the phenol ring; $R_3$ represents an alkyl group, a substituted alkyl group, a substituted aryl group or a substituted heterocyclic group;

$Y_1$ represents a substituted or unsubstituted aryl group, a substituted or unsubstituted alkyl group, a substituted or unsubstituted heterocyclic group,

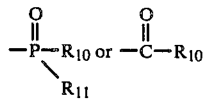

wherein $R_{10}$ and $R_{11}$ each represents a substituted or unsubstituted alkyl group, a substituted or unsubstituted aryl group, a substituted or unsubstituted amino group, a substituted or unsubstituted alkoxy group or a substituted or unsubstituted aryloxy group; $R_4'$ represents a substituted or unsubstituted alkylene group, a substituted or unsubstituted arylene group or a substituted or unsubstituted aralkylene group; $R_4$ represents a substituted or unsubstituted alkyl group, a substituted or unsubstituted or unsubstituted aryl group; with provided that $Y_1$ and $R_4$ are not both alkyl group;

n represents an integer of 1 to 5;

$R_5$ represents a substituted or unsubstituted alkyl group, a substituted or unsubstituted aryl group, a substituted or unsubstituted alkyl or arylsulfonyl group or a substituted or unsubstituted acyl group; $R_6$ represents the same substituent as $R_4$; or $R_5$ and $R_6$ together represent a 5- to 7-membered ring;

$R_7$ and $R_8$ are each selected from the same substituents as $R_4$, or $R_7$ and $R_8$ together represent a 5- to 7-membered ring;

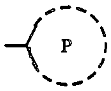

represents a substituted or unsubstituted 5- to 7-membered hetero ring; and $R_9$ represents a substituted or unsubstituted alkyl group having 12 or more carbon atoms.

DETAILED DESCRIPTION OF THE INVENTION

In the present invention, a "color developer which does not substantially contain benzyl alcohol" means that the concentration of benzyl alcohol in the color developer is 0.5 ml/liter or less, and, in particular, it is preferred that no benzyl alcohol is contained in the color developer.

In the present invention, the photographic layer containing a non-coloring compound selected from the group consisting of compounds of the above formulae (I) through (VII) includes silver halide emulsion layers, adjacent layers thereof, intermediate layers, and protective layers, preferably silver halide layers and adjacent layers thereof, most preferably silver halide emulsion layers.

The above-described general formulae are explained in more detail hereunder.

A in formula (I) is an electron attractive group, preferably representing

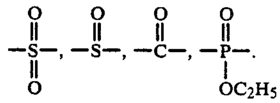

In the groups of $R_1$ through $R_9$ and $Y_1$, $R_4'$, $R_{10}$ and $R_{11}$ in the above-described formulae (I) to (VII); the alkyl group includes a straight chain or branched alkyl group, an aralkyl group, an alkenyl group, an alkynyl group, a cycloalkyl group, a cycloalkenyl group, etc.; the aryl group includes, for example, phenyl group, 4-t-butylphenyl group, 2,4-di-t-amylphenyl group, naphthyl group, etc.; the alkoxy group includes, for example, methoxy group, ethoxy group, benzyloxy group, hexadecyloxy group, octadecyloxy group, etc.; the aryloxy includes, for example, phenoxy group, 2-methylphenoxy group, naphthoxy group, etc.; the alkylamino group includes, for example, methylamino group, butylamino group, octylamino group, etc.; the anilino group includes, for example, phenylamino group, 2-chloroanilino group, 3-dodecyloxycarbonylanilino group, etc.; the alkylene group includes, for example, methylene group, ethylene group, 1,10-decylene group, $—CH_2CH_{OCH_2}CH_2—$, etc.; the arylene group includes, for example, 1,4-phenylene group, 1,3-phenylene group, 1,4-naphthylene group, 1,5-naphthylene group, etc.; the aralkylene group includes, for example,

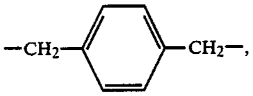

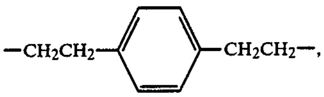

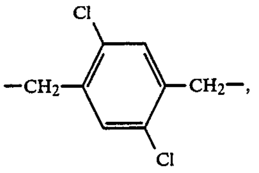

etc.; the heterocyclic group includes, for example, pyrazolyl group, imidazolyl group, triazolyl group, pyridyl group, quinolyl group, piperidyl group, triazinyl group, etc.; the acyl group includes, for example, acetyl group, propanoyl group, dodecanoyl group, 3-phenylpropanoyl group, benzoyl group, 4-dodecyloxybenzoyl group, 4-[α-(2,4-di-tert-amyl)hexaneamido]benzoyl group, etc.; the alkylsulfonyl group includes, for example, methylsulfonyl group, dodecylsulfonyl group, 2-hexyloxyethylsulfonyl group, 2-acetamidopropylsulfonyl group; and the arylsulfonyl group includes, for example, phenylsulfonyl group, 4-dodecyloxyphenylsulfonyl group, 4-acetamidophenylsulfonyl group, 2-octyloxy-4-t-octylphenylsulfonyl group, 1-naphthylsulfonyl group, etc.

Substituents in the substituted alkyl group, substituted aryl group, substituted alkoxy group, substituted aryloxy group, substituted alkylamino group, substituted anilino group, substituted alkylene group, substituted arylene group, substituted aralkylene group, substituted heterocyclic group, substituted acyl group, substituted alkylsulfonyl group, and substituted arylsulfonyl group as represented by $R_1$ to $R_9$ include a halogen atom, an alkyl group, an aryl group, a heterocyclic group, a cyano group, an alkoxy group, an aryloxy group, a heterocyclic-oxy group, an acyloxy group, a carbamoyloxy group, a silyloxy group, a sulfonyloxy group, an acylamino group, an anilino group, an ureido group, an imido group, a sulfamoylamino group, a carbamoylamino group, an alkylthio group, an arylthio group, a heterocyclic-thio group, an alkoxycarbonylamino group, an aryloxycarbonylamino group, a sulfonamido group, a carbamoyl group, an acyl group, a sulfamoyl group, a sulfonyl group, a sulfinyl group, an alkoxycarbonyl group, an aryloxycarbonyl group.

The heterocyclic group as represented by

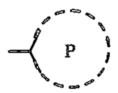

in the formula (VI) is same as the above-mentioned heterocyclic group, which may optionally have the same substituent(s) as above.

Among the compounds of the formulae (I) to (VII), those of the formulae (I), (III), and (IV) are preferred, and those of the formula (I) are more preferred.

The compounds of the formulae (I) through (VII) can be introduced into photographic light-sensitive materials by oil-in-water dipersion method. Regarding the state of the dispersion, the compound may be dispersed alone in water, or the compound may be co-dispersed together with some other constitutional components of photographic materials. In particular, the compound is preferably co-dispersed together with an oil-soluble coupler.

The amount of the compound of the formulae (I) through (VII) to be added to the photographic material is not limited, but may freely be selected; it is preferably used in an amount is from 20 to 300 mole%, and more preferably from 40 to 150 mole%, with respect to the amount of the oil-soluble coupler co-used.

Specific examples of the compounds of the formulae (I) to (VII) are given hereunder, which, however, do not whatsoever restrict the scope of the present invention.

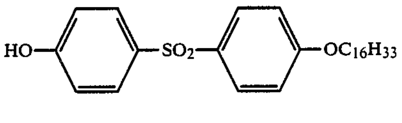

(I-1)

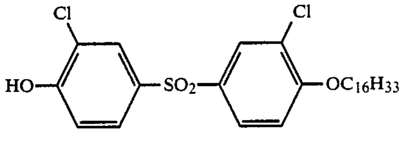

(I-2)

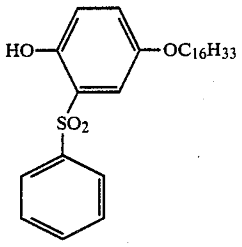

(I-3)

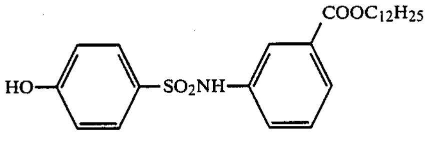

(I-4)

-continued
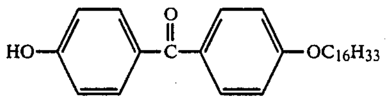
(I-5)
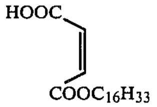
(II-1)
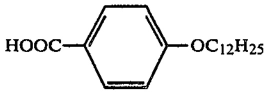
(II-2)
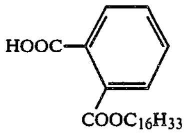
(II-3)
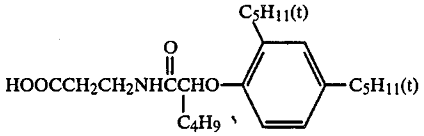
(II-4)
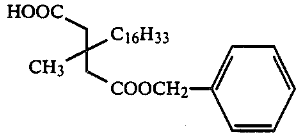
(II-5)
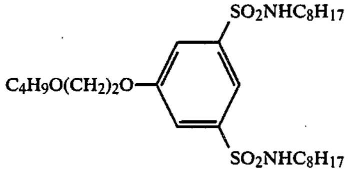
(III-1)
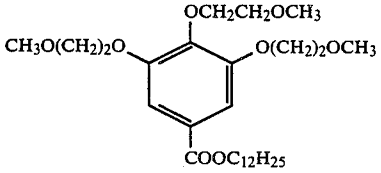
(III-2)
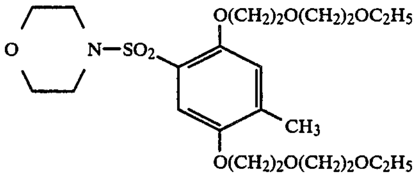
(III-3)
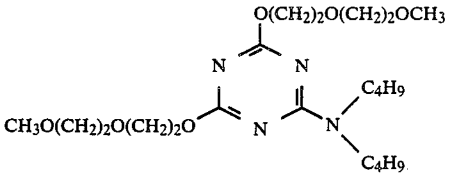
(III-4)
$(C_4H_9OCH_2CH_2O)_3P{=}O$ (III-5)
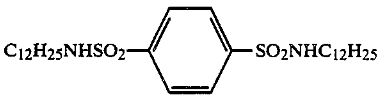
(IV-1)
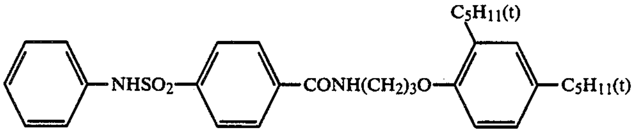
(IV-2)
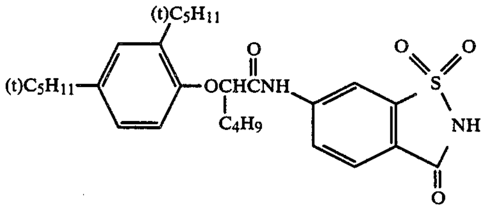
(IV-3)
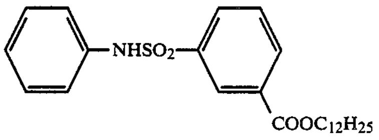
(IV-4)
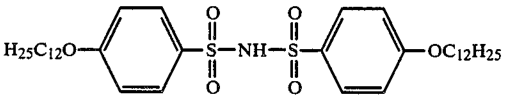
(IV-5)
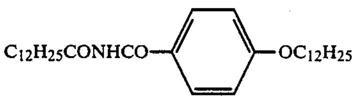
(V-1)
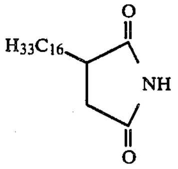
(V-2)
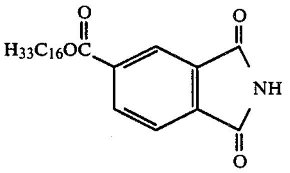
(V-3)

-continued

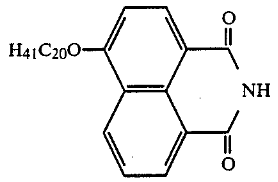

(V-4)

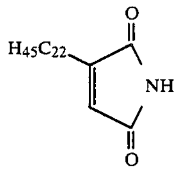

(V-5)

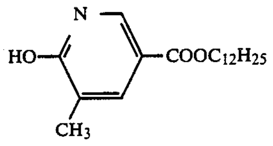

(VI-1)

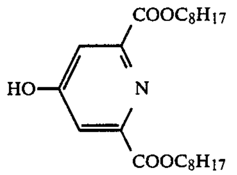

(VI-2)

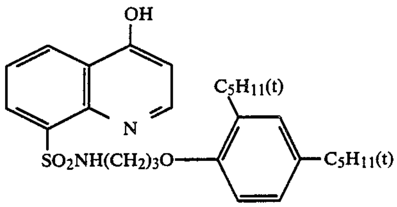

(VI-3)

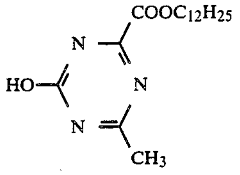

(VI-4)

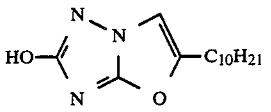

(VI-5)

$C_{18}H_{37}OH$ (VII-1)

$C_{12}H_{25}OH$ (VII-2)

$C_{10}H_{21}O(CH_2)_5O(CH_2)_2OH$ (VII-3)

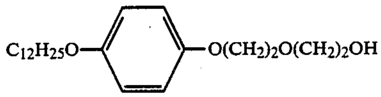

(VII-4)

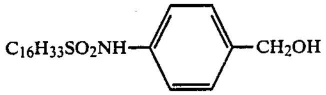

(VII-5)

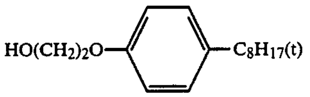

(VII-6)

The compounds represented by the general formulae (I) to (VII) are synthesized by the method described, for example, in U.S. Pat. Nos. 4,207,393, 4,363,873, 4,430,422, and 4,464,464 or other well known methods in the art.

Oil-soluble couplers which are preferably used in the present invention are at least one selected from couplers of the following formulae (A) and (B), at least one selected from couplers of the following formulae (C) and (D) and at least one selected from couplers of the following formula (E).

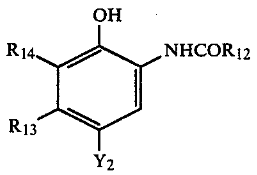

(A)

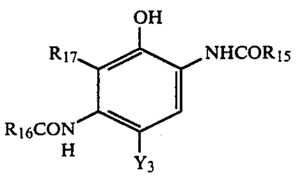

(B)

-continued

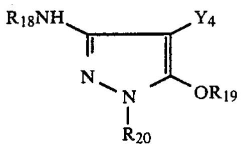

(C)

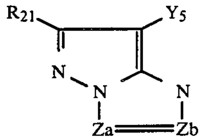

(D)

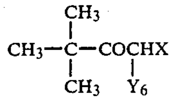

(E)

In these formulae:

$R_{12}$, $R_{15}$, and $R_{16}$ each represents an aliphatic group, an aromatic group, a heterocyclic group, an aromatic amino group, or a heterocyclic amino group; $R_{13}$ represents an aliphatic group; $R_{14}$ and $R_{17}$ each represents a hydrogen atom, a halogen atom, an aliphatic group, an aliphatic-oxy group, or an acylamino group;

$R_{18}$ and $R_{20}$ each represents a substituted or unsubstituted phenyl group;

$R_{19}$ represents a hydrogen atom, an aliphatic or aromatic acyl group, or an aliphatic or aromatic sulfonyl group;

$R_{21}$ represents a hydrogen atom, an aliphatic group, an aromatic group, a heterocyclic group, an aliphatic oxy group, an acylamino group, an aromatic amino group, an ureido group, an aliphatic thio group, an aromatic thio group, an alkoxycarbonylamino group, a sulfonamido group, a carbamoyl group, a sulfamoyl group, an aliphatic sulfonyl group, an aromatic sulfonyl group, an aliphatic or aromatic acyl group, or an alkoxycarbonyl group;

X represents a substituted or unsubstituted N-phenylcarbamoyl group;

Za and Zb each represents a methine group, a substituted methine group or =N—;

$Y_2$, $Y_3$, and $Y_5$ each represents a halogen atom or a group capable of being removed in the coupling reaction with an oxidation product of a developing agent (hereinafter referred to as "coupling off group" in short);

$Y_4$ represents a hydrogen atom or a coupling off group;

$Y_6$ represents a coupling off group;

or $R_{13}$ and $R_{14}$, and $R_{16}$ and $R_{17}$, in the formulae (A) and (B), respectively, may form a 5-, 6-, or 7-membered ring;

or $R_{12}$, $R_{13}$, $R_{14}$, or $Y_2$; $R_{15}$, $R_{16}$, $R_{17}$, or $Y_3$; $R_{18}$, $R_{19}$, $R_{20}$, or $Y_4$; $R_{21}$, Za, Zb, or $Y_5$; and X or $Y_6$ may form a dimer or higher polymer.

The aliphatic group as mentioned above means a straight-chain, branched-chain or cyclic alkyl, alkenyl or alkynyl group.

Typical compounds of the couplers of the above-mentioned formulae (A) through (E) and methods for the manufacture thereof are described in various publication, for example, as follows:

The cyan couplers of the formulae (A) and (B) can be synthesized by conventional methods. For instance, the cyan couplers of the formula (A) can be synthesized by the methods as described in U.S. Pat. Nos. 2,423,730 and 3,772,002. The cyan couplers of the formula (B) can be synthesized by the methods as described in U.S. Pat. Nos. 2,895,826, 4,333,999, and 4,327,173.

The magenta couplers of the formula (C) can be synthesized by the methods as described in Japanese Patent Application (OPI) Nos. 74027/74, and 74028/74, Japanese Patent Publication Nos. 27930/73 and 33846/78, and U.S. Pat. No. 3,519,429. The magenta couplers of the formula (D) can be synthesized by the methods as described in U.S. Pat. No. 3,725,067 and Japanese Patent Application (OPI) No. 162548/84, 171956/84 and 33552/85.

The yellow couplers of the formula (E) can be synthesized by the methods as described in Japanese Patent Application (OPI) No. 48541/79, Japanese Patent Publication No. 10739/83, U.S. Pat. No. 4,326,024, and *Research Disclosure,* RD No. 18053.

Preferable examples of the couplers of the formulae (A) and (B) are given hereunder.

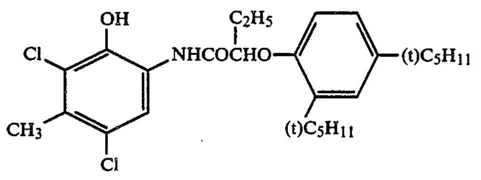
(C-1)

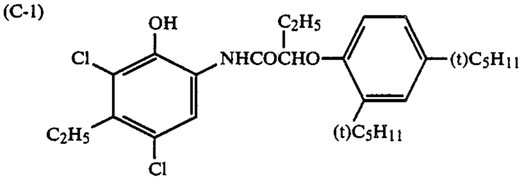
(C-2)

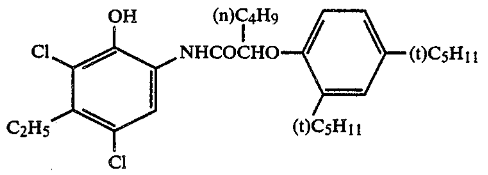
(C-3)

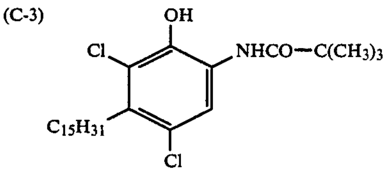
(C-4)

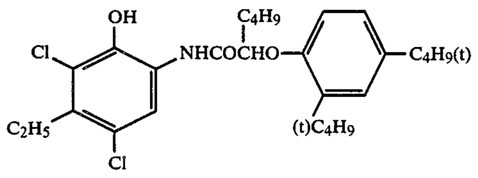
(C-5)

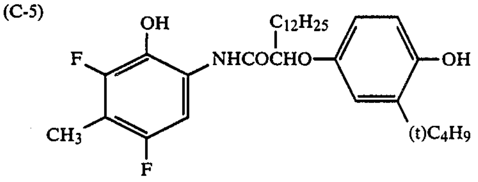
(C-6)

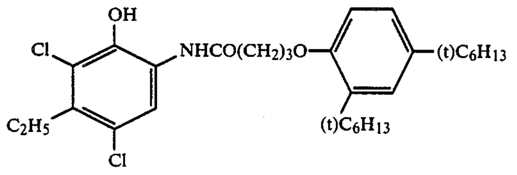
(C-7)

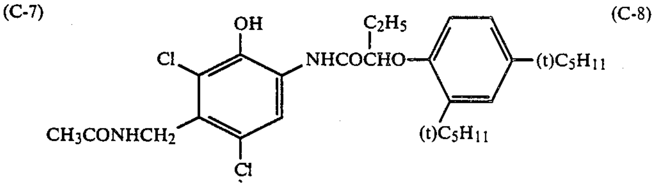
(C-8)

-continued
(C-9)
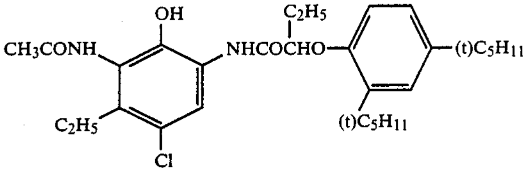
(C-10)
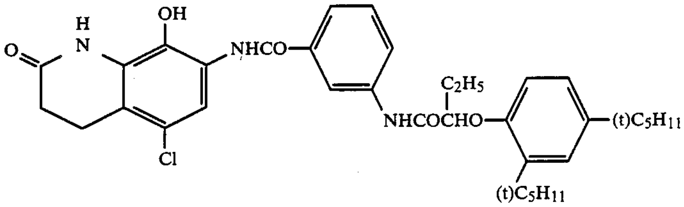
(C-11)
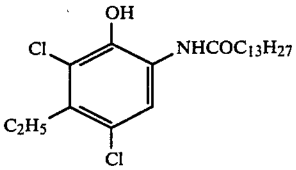
(C-12)
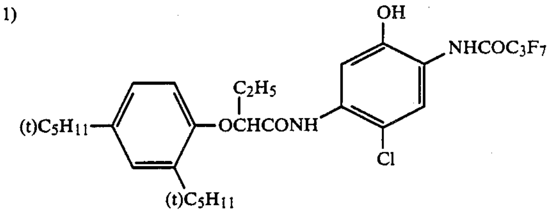
(C-13)
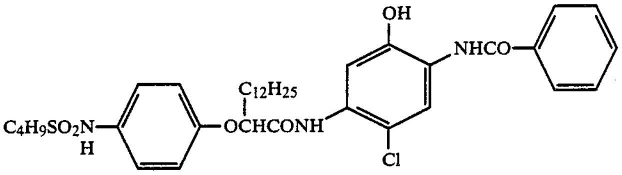
(C-14)
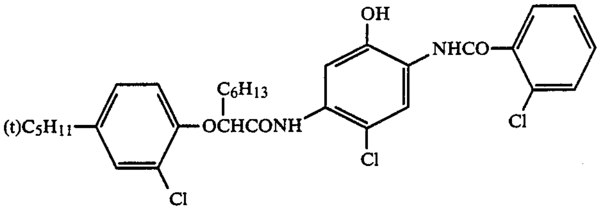
(C-15)
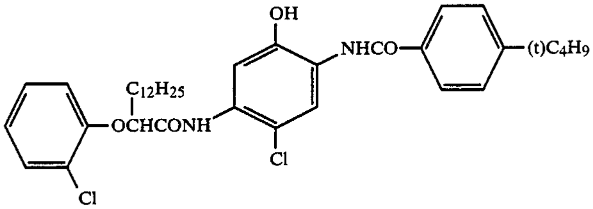
(C-16)
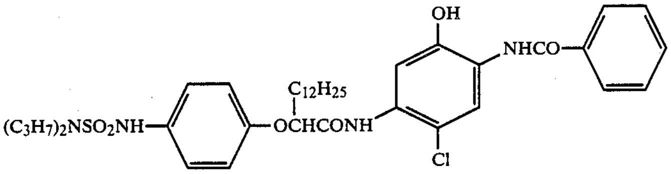

-continued
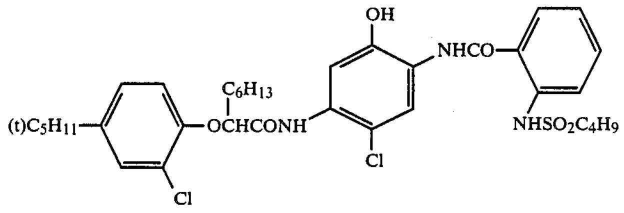
(C-17)
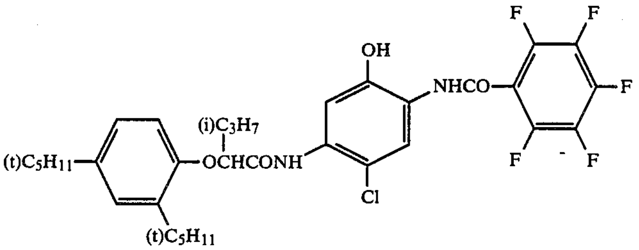
(C-18)
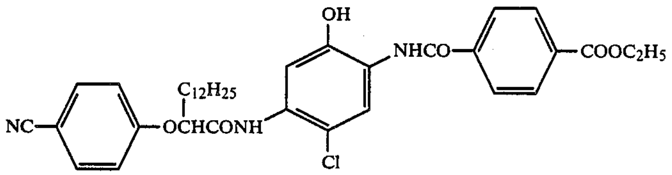
(C-19)
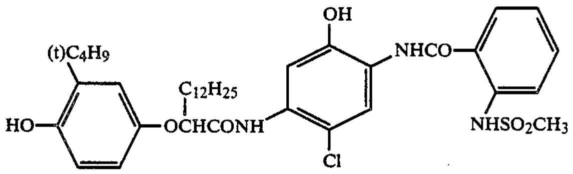
(C-20)
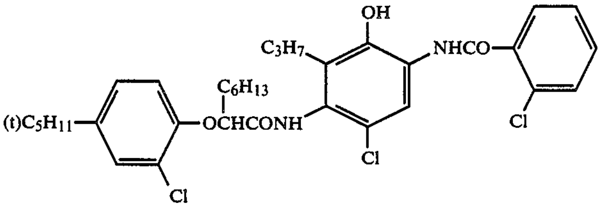
(C-21)
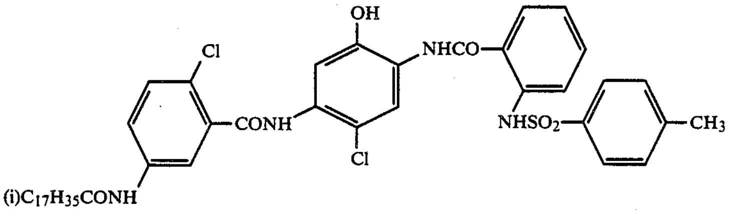
(C-22)
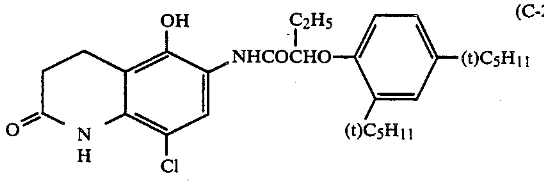
(C-23)
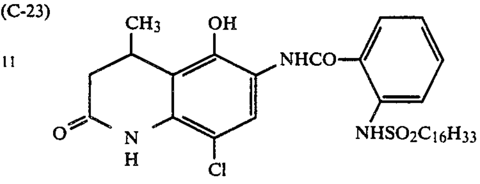
(C-24)

-continued
(C-25)
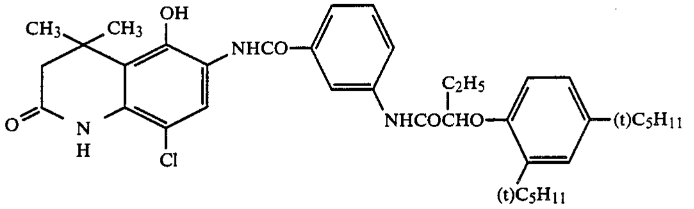
(C-26)
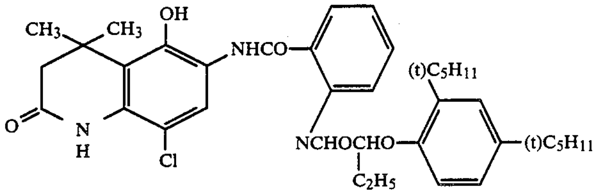
(C-27)
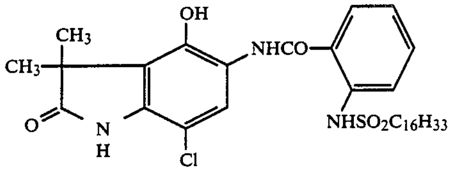
(C-28)
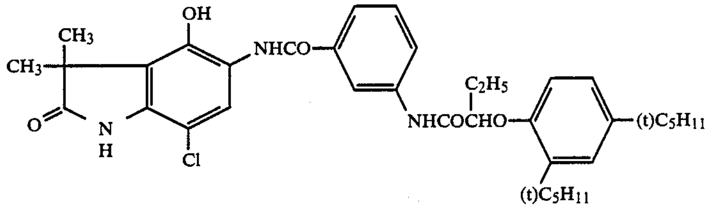
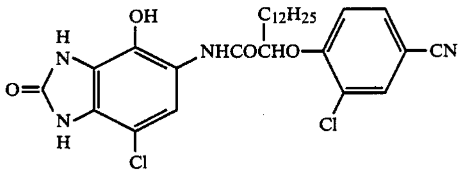
(C-29)
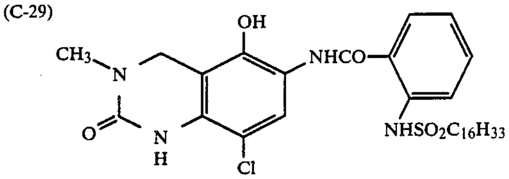
(C-30)
(C-31)
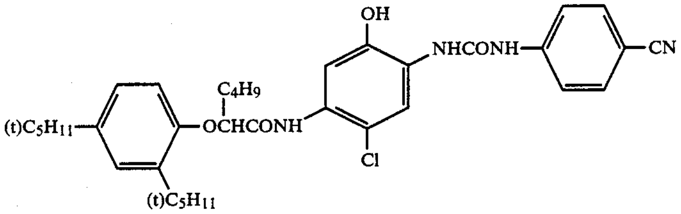
(C-32)
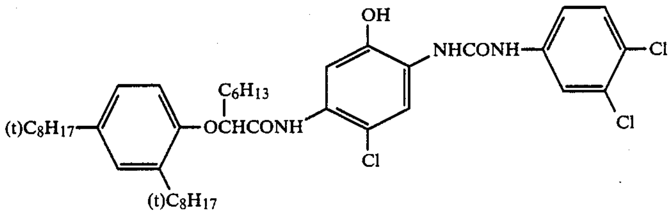

-continued
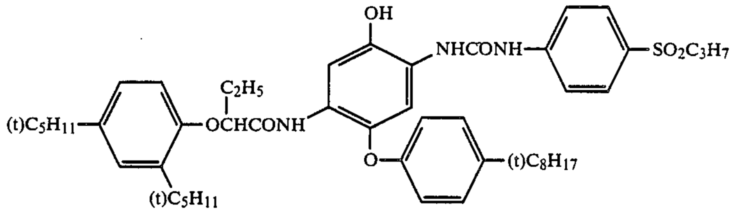
(C-33)
Preferable examples of the couplers of the formulae (C) and (D) are as follows:
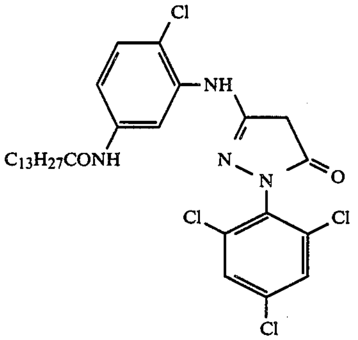
(M-1)
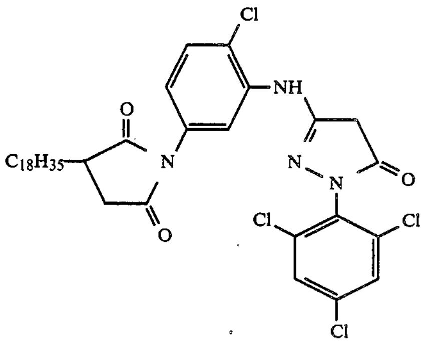
(M-2)
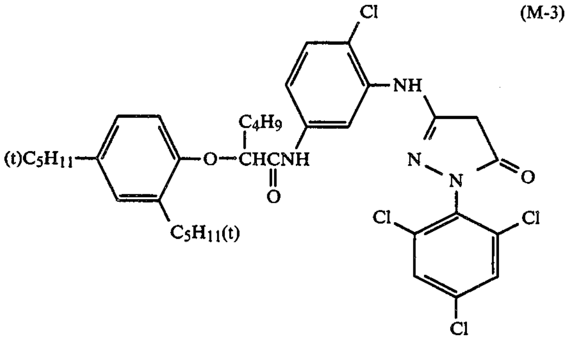
(M-3)
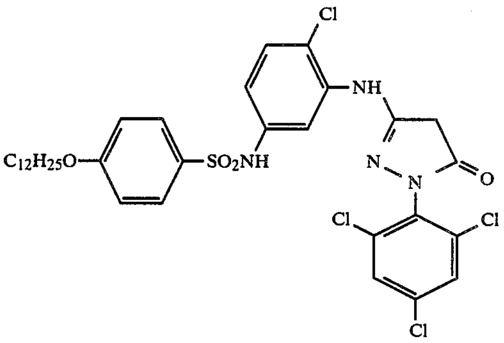
(M-4)
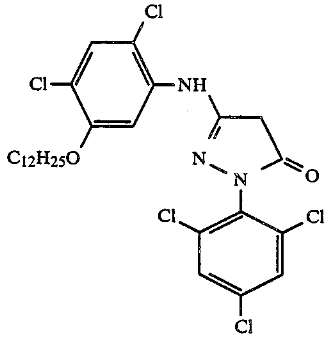
(M-5)
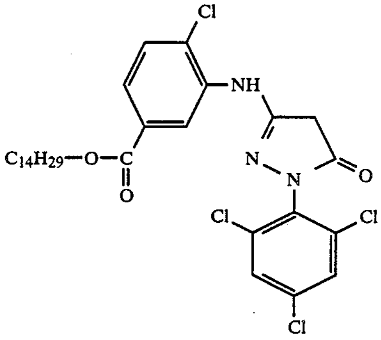
(M-6)
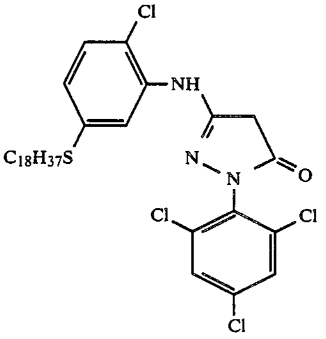
(M-7)
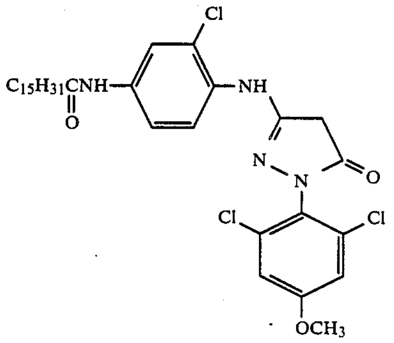
(M-8)

-continued
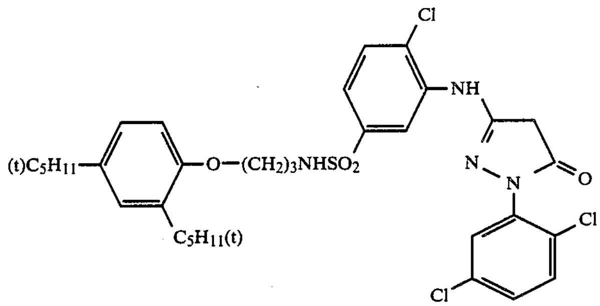
(M-9)
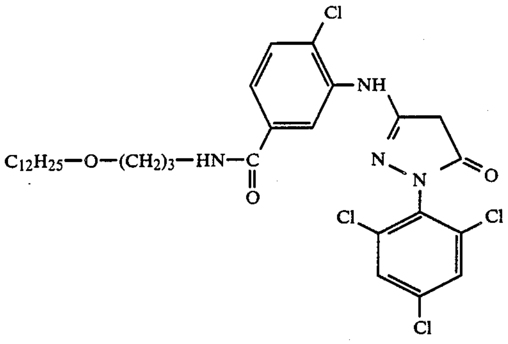
(M-10)
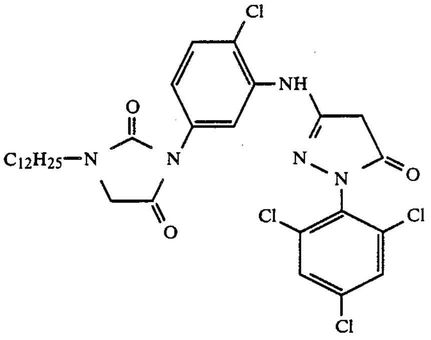
(M-11)
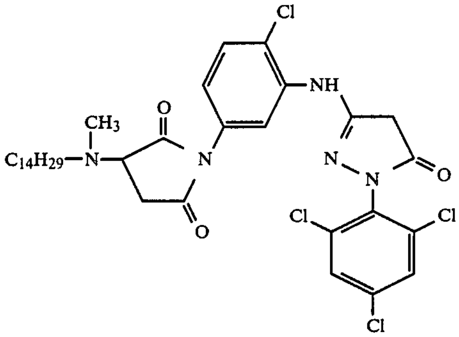
(M-12)
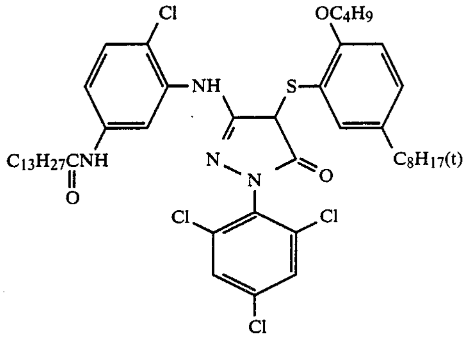
(M-13)
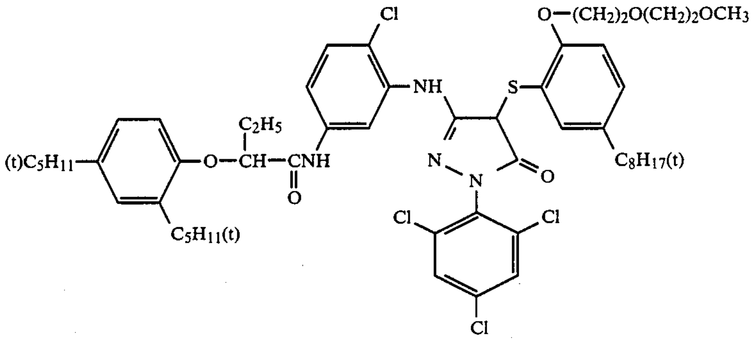
(M-14)

-continued
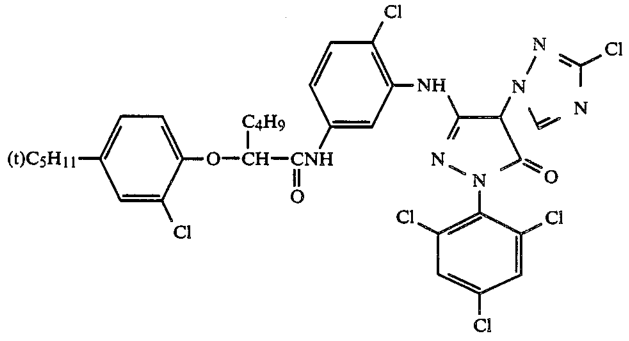
(M-15)
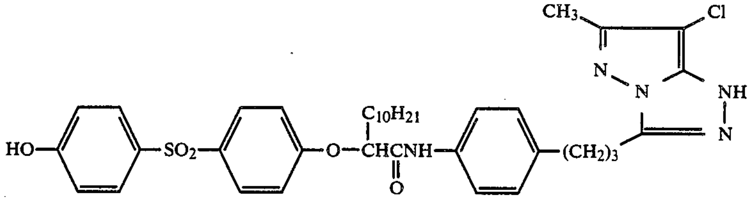
(M-16)
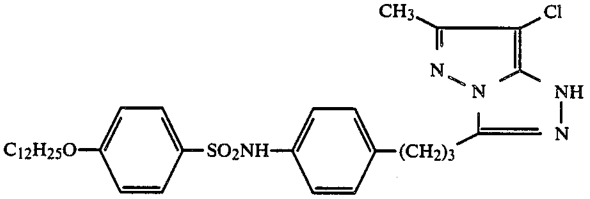
(M-17)
(M-18)
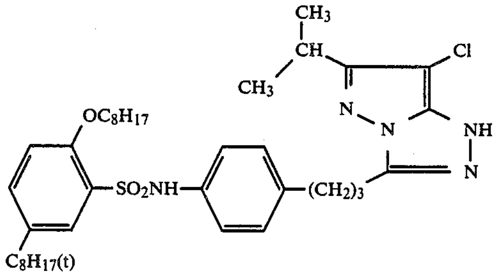
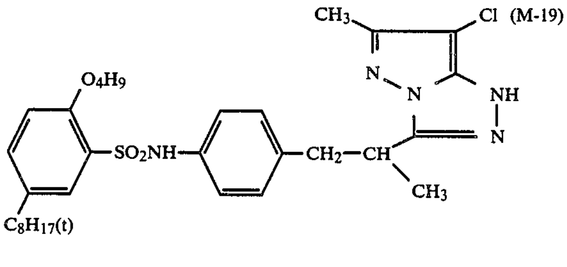
(M-19)
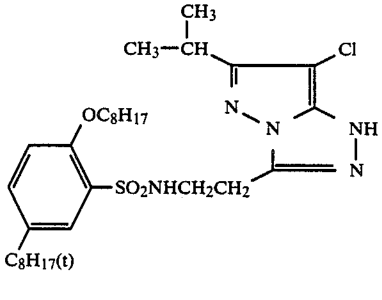
(M-20)
(M-21)
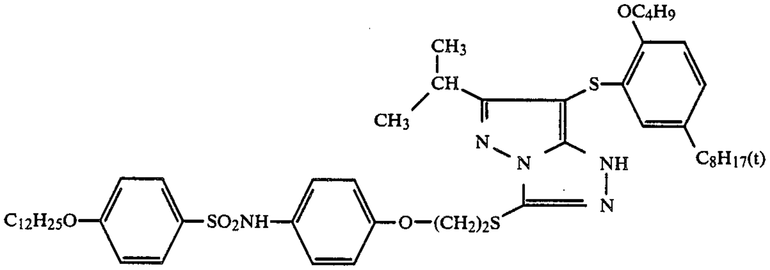

-continued
(M-22)
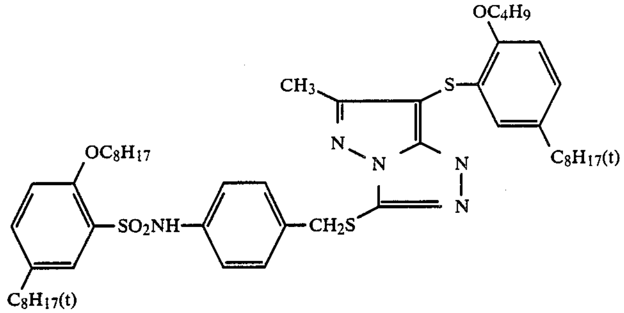
(M-23)
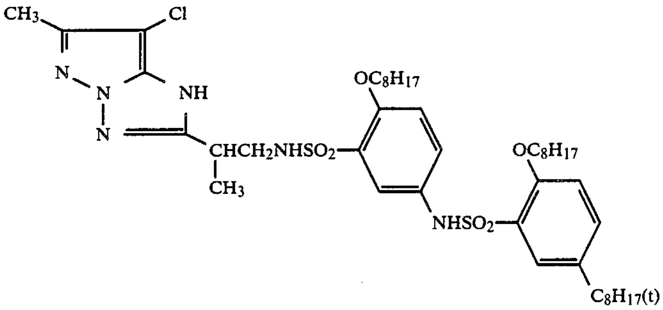
(M-24)
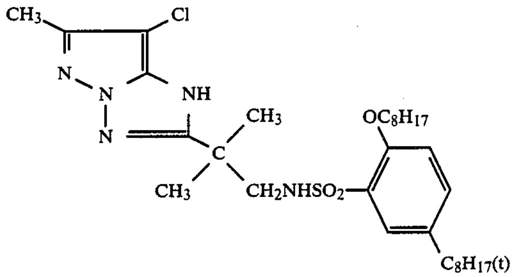
(M-25)
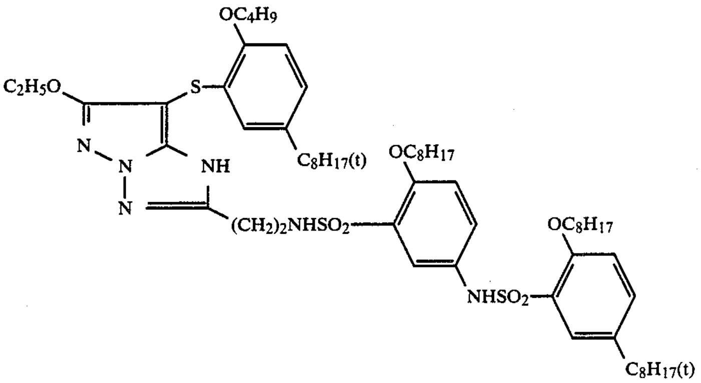
(M-26)
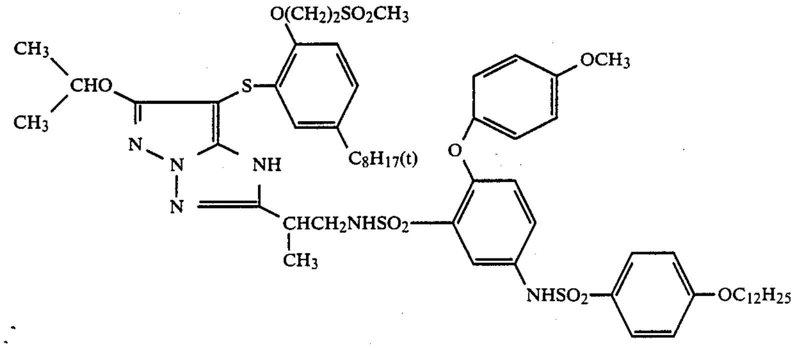

-continued
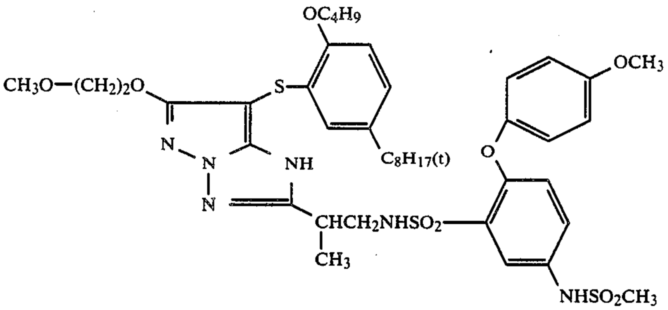
(M-27)
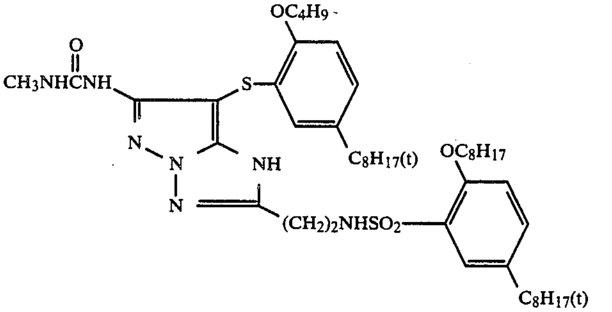
(M-28)
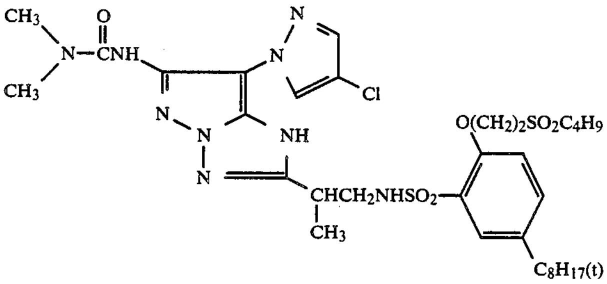
(M-29)
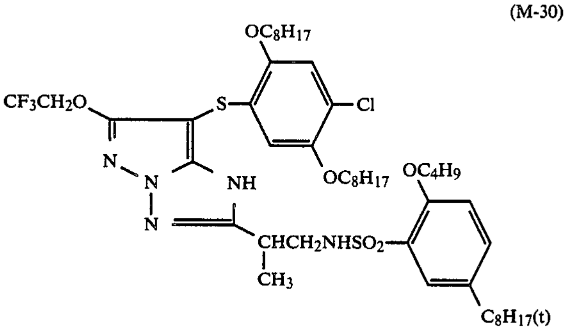
(M-30)
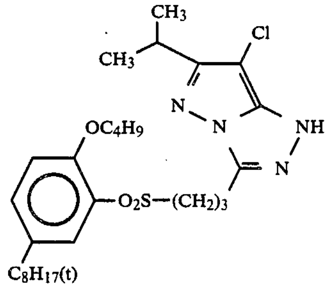
(M-31)
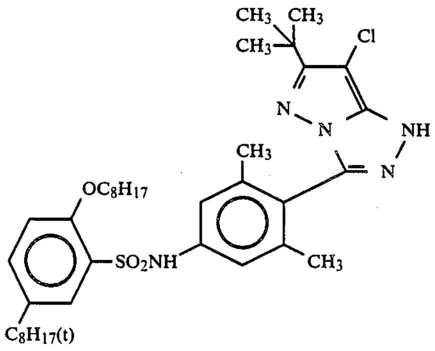
(M-32)

-continued
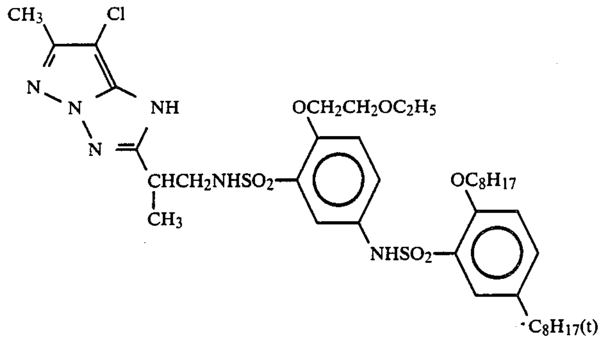
(M-33)
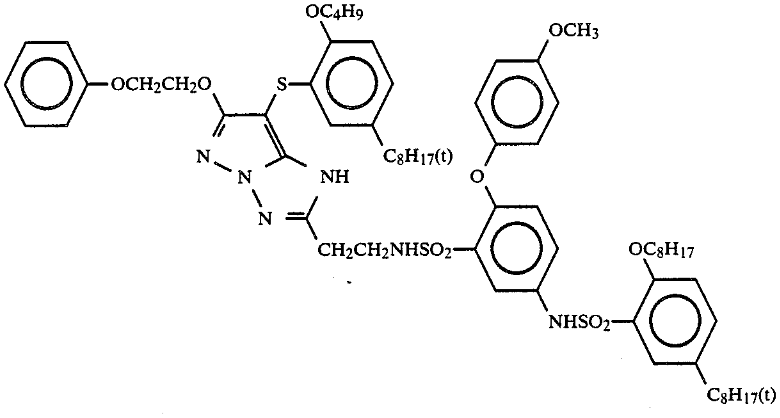
(M-34)
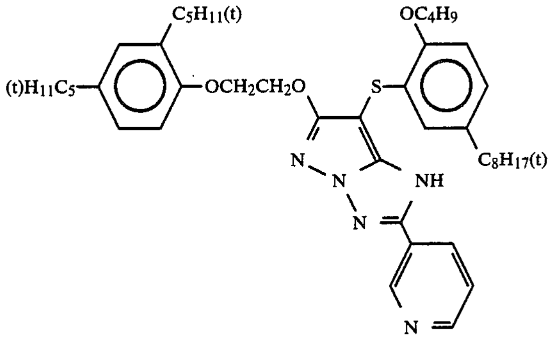
(M-35)
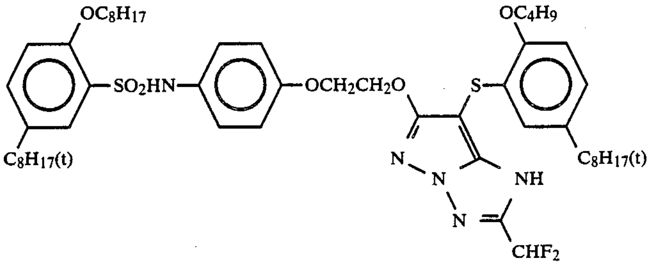
(M-36)
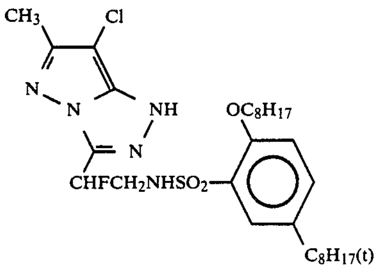
(M-37)
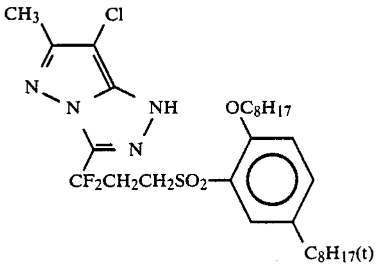
(M-38)

-continued
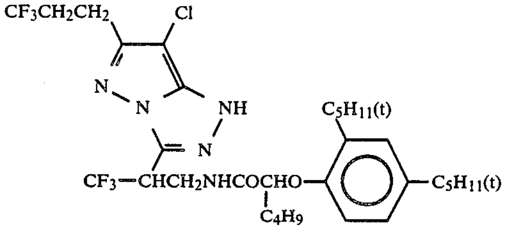
(M-39)
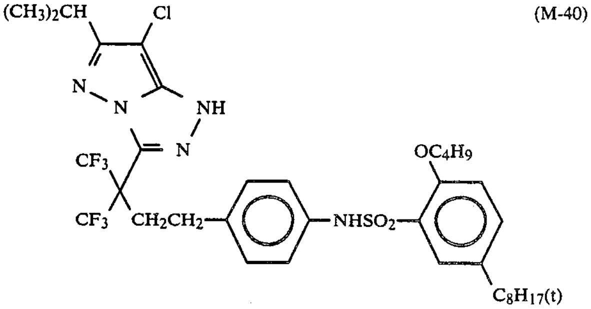
(M-40)
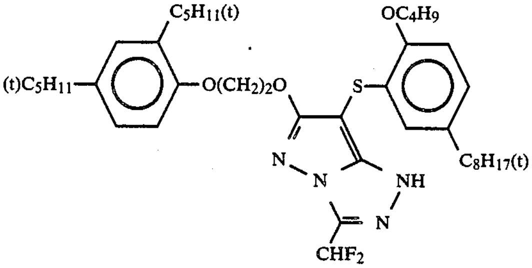
(M-41)
Preferable examples of the couplers of the formula (E) are as follows:
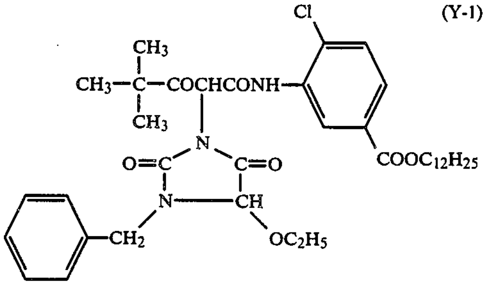
(Y-1)
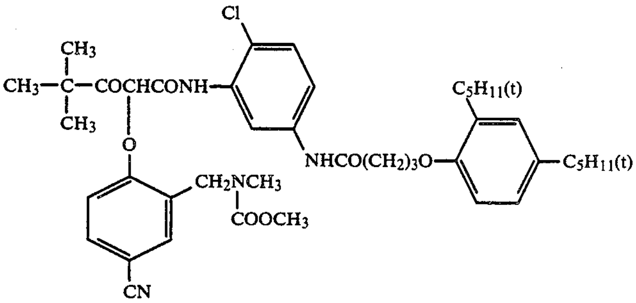
(Y-2)
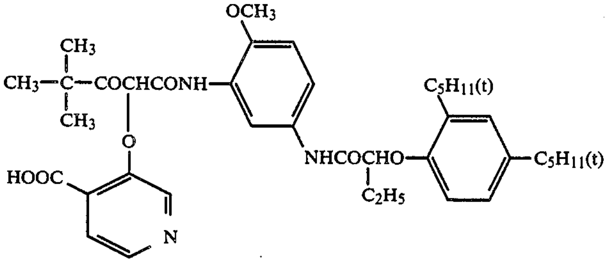
(Y-3)
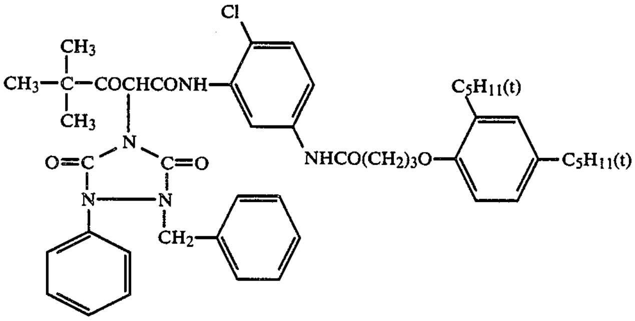
(Y-4)

-continued
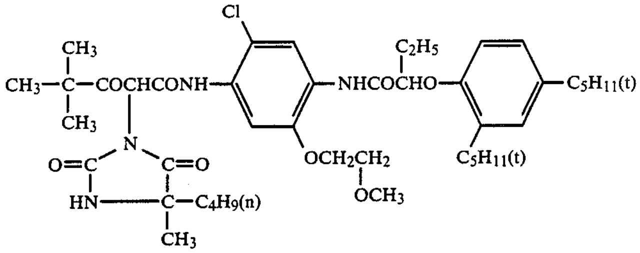
(Y-5)
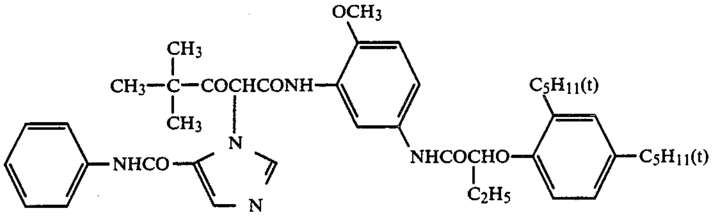
(Y-6)
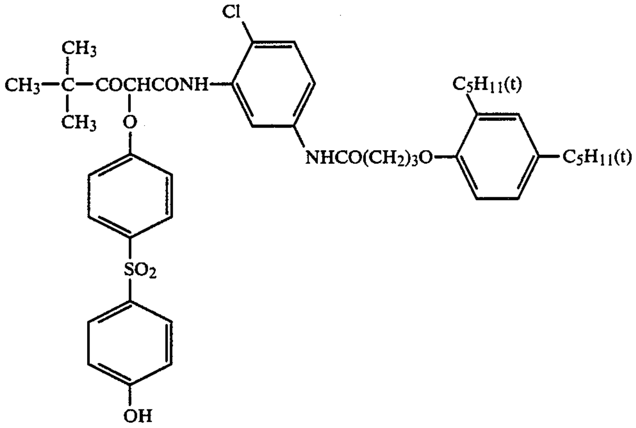
(Y-7)
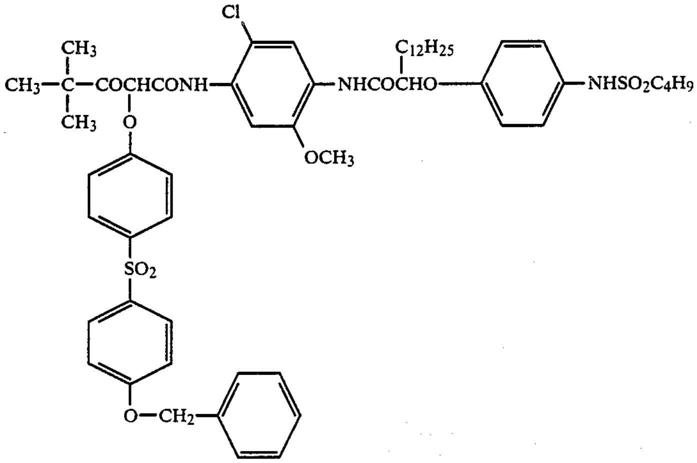
(Y-8)

-continued
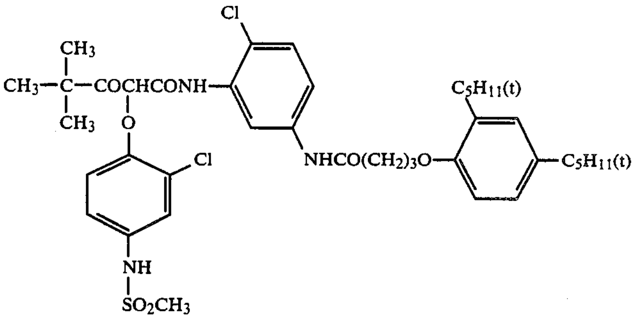
(Y-9)
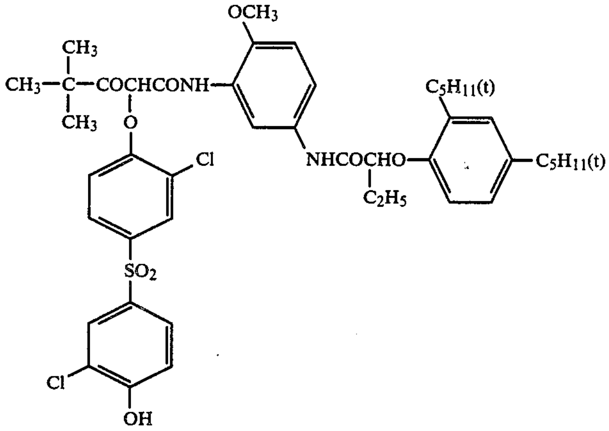
(Y-10)
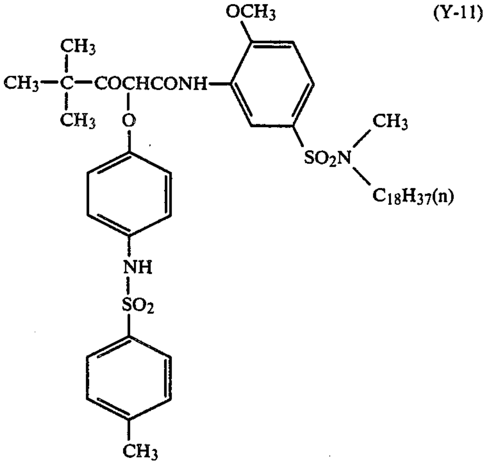
(Y-11)
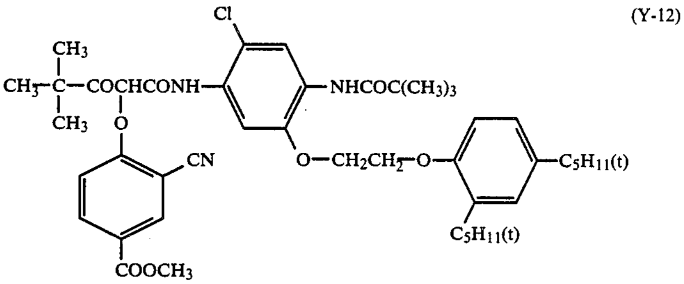
(Y-12)
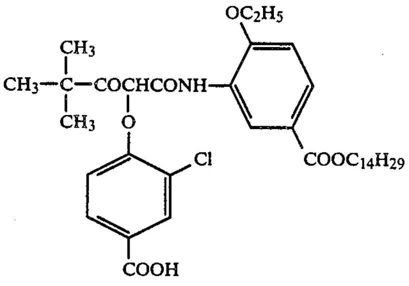
(Y-13)
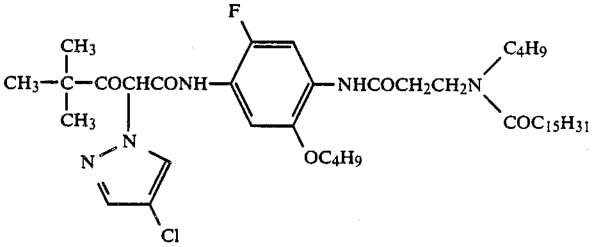
(Y-14)

-continued
(Y-15)
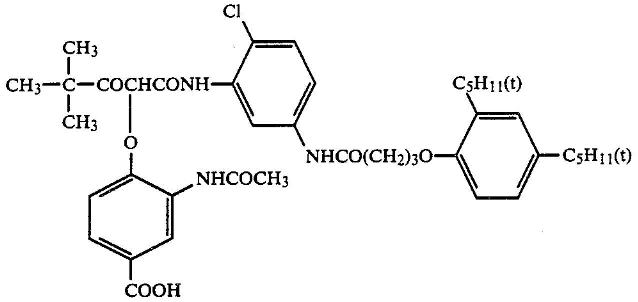
(Y-16)
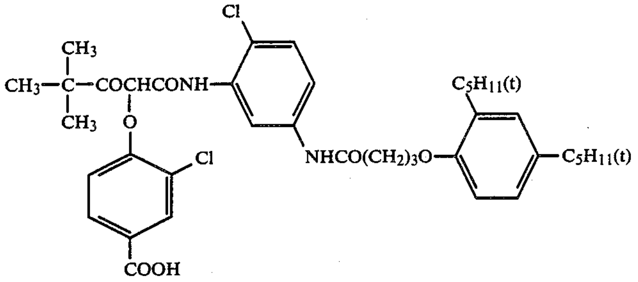
(Y-17)
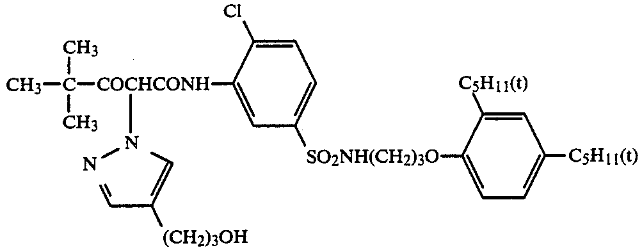
(Y-18)
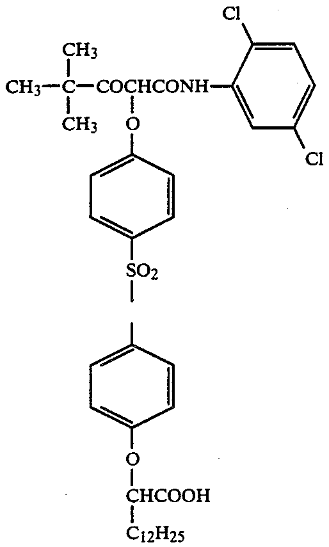
(Y-19)
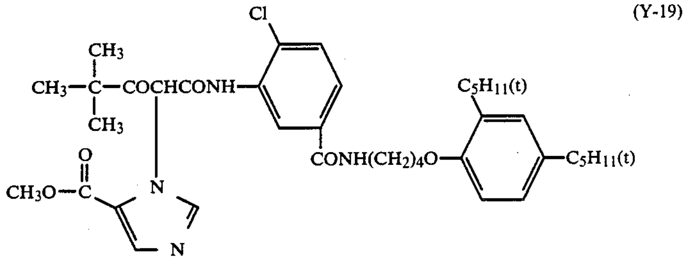
(Y-20)
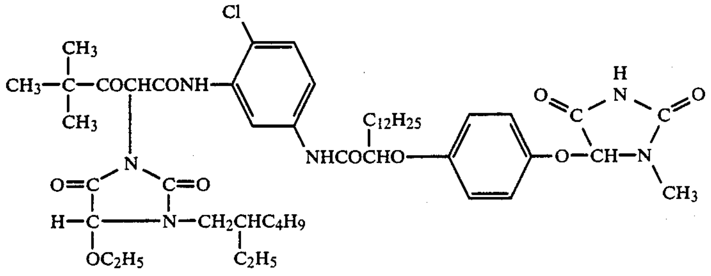

-continued
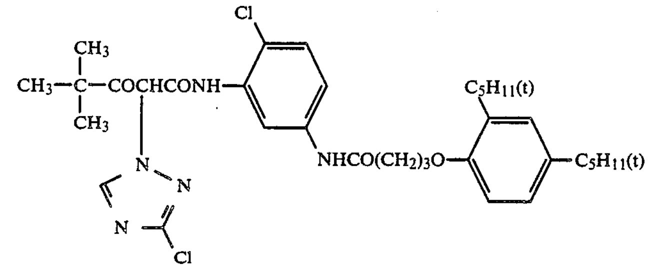
(Y-21)
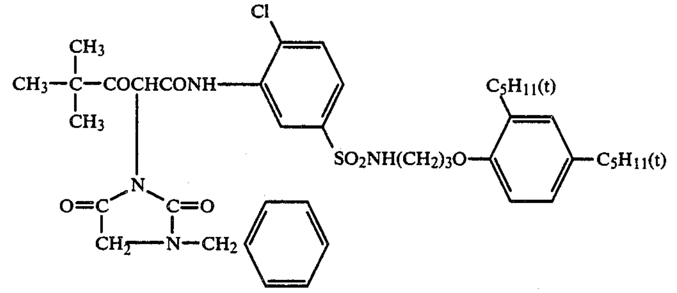
(Y-22)
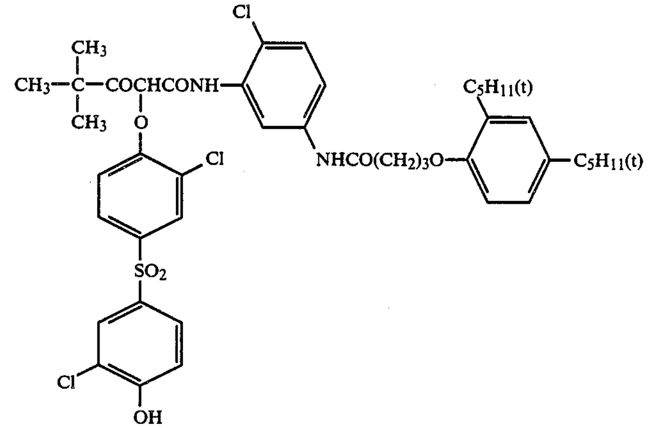
(Y-23)
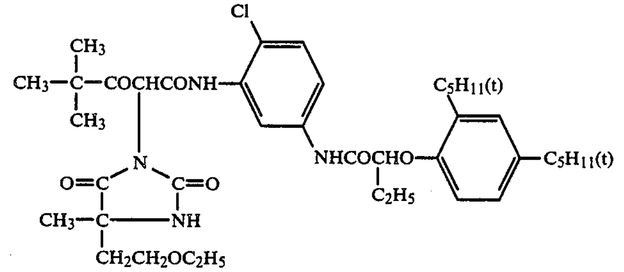
(Y-24)
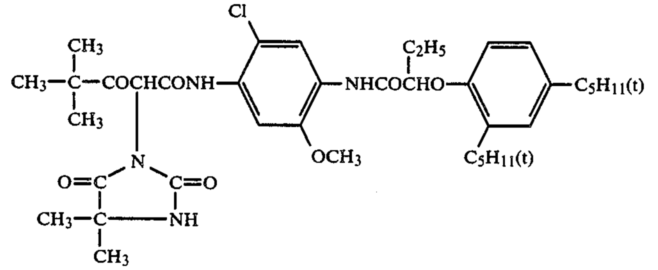
(Y-25)

-continued
(Y-26)
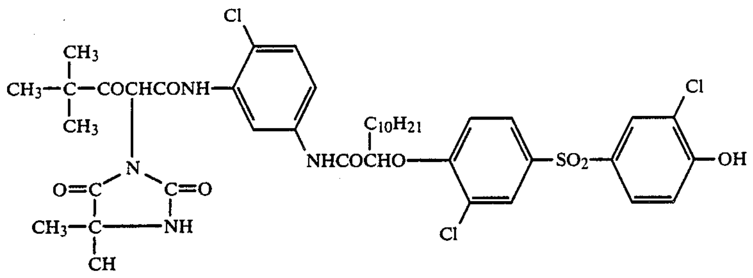
(Y-27)
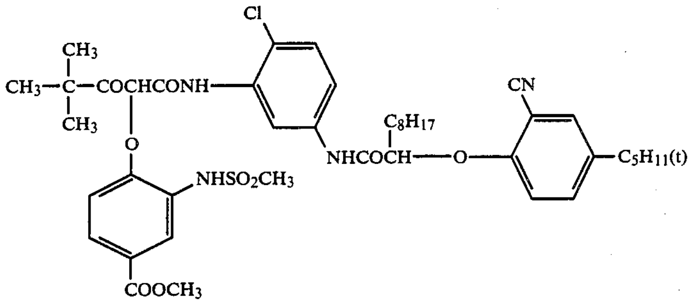
(Y-28)
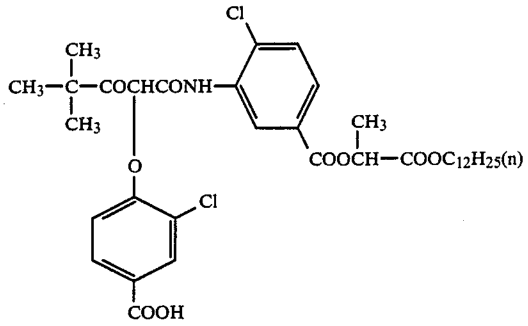
(Y-29)
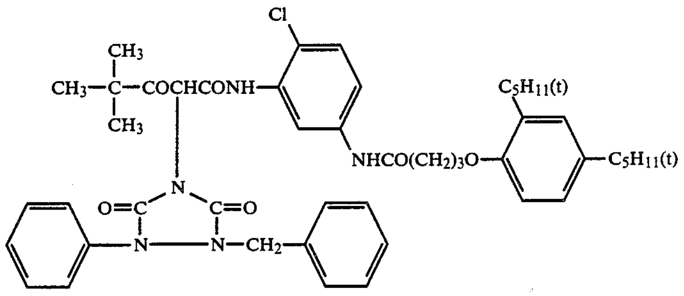
(Y-30)
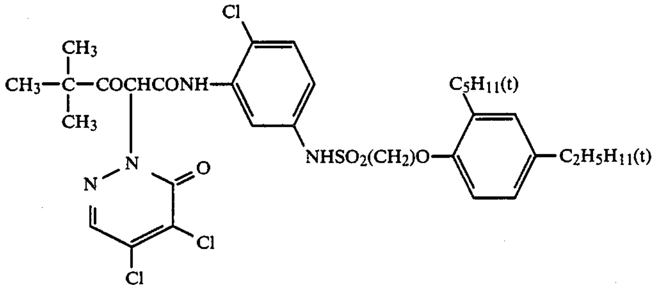

-continued
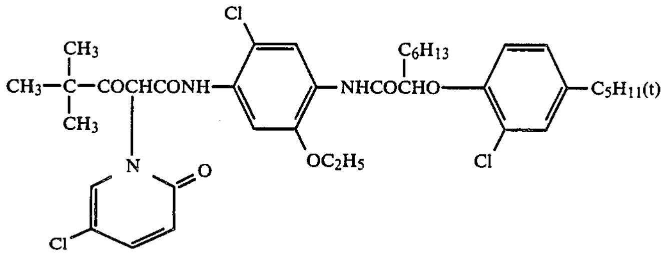
(Y-31)
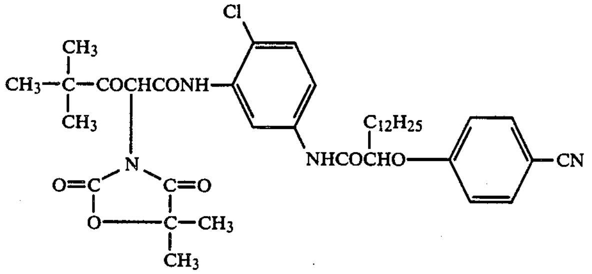
(Y-32)
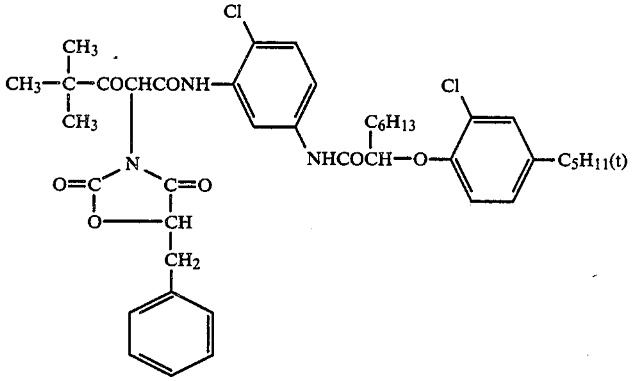
(Y-33)
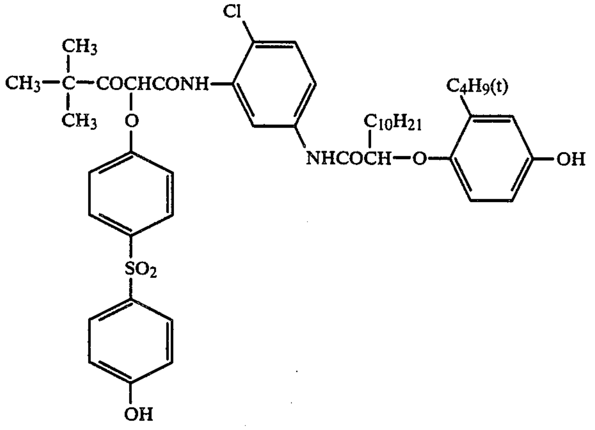
(Y-34)
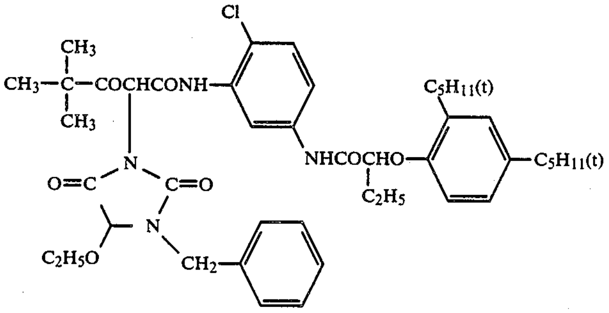
(Y-35)

-continued (Y-36)

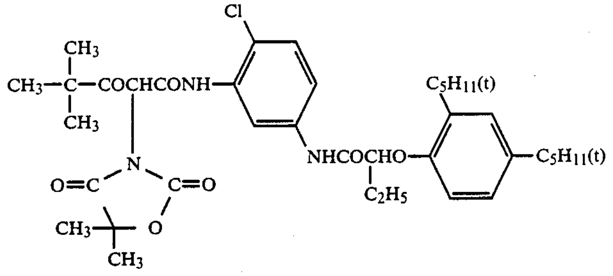

(Y-37)

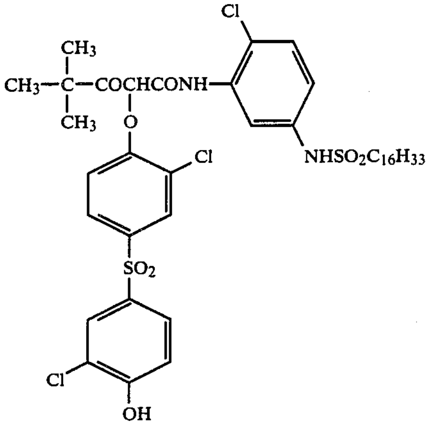

(Y-38)

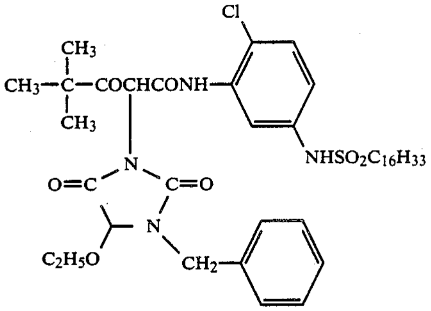

(Y-39)

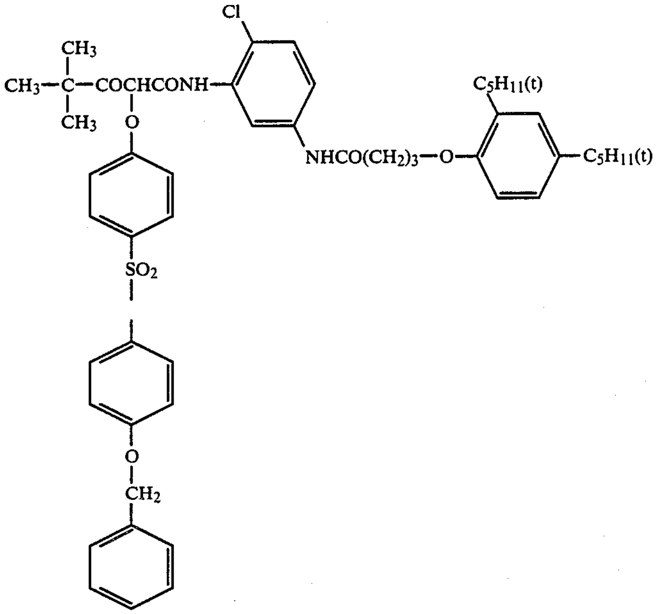

Regarding the incorporation of the couplers in the photographic materials of the present invention, two or more kinds of the couplers can be incorporated in the same light-sensitive layer, or the same coupler can be incorporated in two or more different light-sensitive layers, in order that the photographic materials can have the desired characteristics.

In the practice of the present invention, the couplers can be introduced into the photographic light-sensitive materials by oil-in-water dispersion method. In the oil-in-water dispersion method, the coupler is dissolved in a single solution containing either one of high-boiling point organic solvent having a boiling point of 175° C. or higher or so-called auxiliary solvent having a low boiling point, or in a mixed solution thereof, and then, the resulting solution is finely dispersed in an aqueous medium such as water of gelatin-aqueous solution in the presence of a surfactant. Examples of high-boiling point organic solvents that can be used are described, e.g., in U.S. Pat. No. 2,322,027. The dispersion may be accompanied by phase inversion, and if desired, the auxiliary solvent as used can be removed or reduced by distillation, noodle washing, or ultrafiltration. The thus obtained dispersion can be coated on a support.

Specific examples of the high-boiling point organic solvents which can be used in the present invention include phthalates (such as dibutyl phthalate, dicyclohexyl phthalate, di-2-ethylhexyl phthalate, decyl phthalate, etc.), phosphates and phosphonates (such as triphenyl phosphate, tricresyl phosphate, 2-ethylhexyldiphenyl phosphate, tricyclohexyl phosphate, tri-2-ethylhexyl phosphate, tridodecyl phosphate, tributoxyethyl phosphate, trichloropropyl phosphate, di-2-ethylhexylphenyl phosphate, etc.), benzoates (such as 2-ethylhexyl benzoate, dodecyl benzoate, 2-ethylhexyl p-hydroxy-benzoate, etc.), amides (such as diethyldodecanamide, N-tetradecylpyrrolidone, etc.), alcohols and phenols (such as isostearyl alcohol, 2,4-di-tert-amylphenol, etc.), aliphatic carboxylates (such as dioctyl azelate, glycerol tributyrate, isostearyl lactate, trioctyl citrate, etc.), aniline derivatives (such as N,N-dibutyl-2-butoxy-5-tert-octylaniline, etc.), hydrocarbons (such as paraffin, dodecylbenzene, diisopropylnaphthalene, etc.). As the auxiliary solvent can be used organic solvents having a boiling point of about 30° C. or higher, preferably 50° C. or higher, to about 160° C. or lower; and typical examples thereof are ethyl acetate, butyl acetate, ethyl propionate, methylethylketone, cyclohexanone, 2-ethoxyethyl acetate, dimethylformamide, etc.

The standard amount of the color coupler to be used in the present invention is within the range of from 0.001 to 1 mole, per one mole of the light-sensitive silver halide as used together; and preferably, the amount of the yellow coupler is 0.01 to 0.5 mole, that of the magenta coupler is 0.003 to 0.3 mole, and that of the cyan coupler is 0.002 to 0.3 mole, each per one mole of the light-sensitive silver halide.

The photographic light-sensitive materials to be processed in accordance with the present invention can contain a color fog-inhibitor or color stain-inhibitor selected from hydroquinone derivatives aminophenol derivatives, amines, gallic acid derivatives, catechol derivatives, ascorbic acid derivatives, non-coloring couplers and sulfonamidophenol derivatives.

Known discoloration-inhibitors can be used in the photographic light-sensitive materials of the present invention. Typical examples of organic discoloration-inhibitors that can be used include hindered phenols such as hydroquinones, 6-hydroxychromans, 5-hydroxycoumarans, spirochromans, p-alkoxyphenols and bisphenols, and gallic acid derivatives, methylenedioxybenzenes, aminophenols, hindered amines, as well as ether and ester derivatives thereof where the phenolic hydroxyl group is silylated or alkylated. In addition, metal complexes such as (bis-salicylaldoximato)nickel complexes and (bis-N,N-dialkyl-dithiocarbamato)nickel complexes can also be used.

Compounds having both partial structure of hindered amine and hindered phenol in one molecule, as described, e.g., in U.S. Pat. No. 4,268,539, are effective for the prevention of the deterioration of the yellow-colored images due to heat, moisture, and light. Spiroindanes as described in Japanese Patent Application (OPI) No. 159644/81 and hydroquinone-diether- and monoether-substituted chromans as described in Japanese Patent Application (OPI) No. 89835/80 are effective for the prevention of the deterioration of the magenta-colored images, especially due to light.

Benzotriazole-type ultraviolet absorbents are preferably used for improving the preservation-stability, especially light-fastness, of the cyan images. The ultraviolet absorbent can be co-emulsified with the cyan coupler.

The amount of the ultraviolet absorbent to be coated is enough to be satisfactory for imparting the light-stability to the cyan-colored images. If, however, the amount is too large, the non-exposed part (white background part) of the color photographic material will be yellowed, and therefore, the amount is preferably within the range of from $1\times10^{-4}$ mole/m$^2$ to $2\times10^{-3}$ mole/m$^2$, especially $5\times10^{-4}$ mole/m$^2$ to $1.5\times10^{-3}$ mole/m$^2$.

In the constitution of the light-sensitive layer of general color papers, the ultraviolet absorbent is incorporated into either one, preferably both, of the layers as adjacent to the both sides of the cyan coupler-containing red-sensitive emulsion layer. When the ultraviolet absorbent is added to the intermediate layer between the green-sensitive layer and the red-sensitive layer, this may be coemulsified with the color stain-inhibitor. In the case of ultraviolet absorbent is added to the protective layer, another protective layer can be provided as an outermost layer. The protective layer can contain a matting agent or the like.

The photographic light-sensitive materials of the present invention can contain the ultraviolet absorbent in the hydrophilic colloid layer.

The photographic light-sensitive materials of the present invention can contain a water-soluble dye in the hydrophilic colloid layers, as a filter dye, for irradiation prevention, for halation prevention, or for other various purposes.

The photographic light-sensitive materials of the present invention can contain a whitening agent such as stilbene-type, triazine-type, oxazole-type, coumarin-type or the like compounds, in the photographic layers or in other hydrophilic colloid layers. The whiteness to be used may be water-soluble, or, as the case may be, water-insoluble whiteners can be used in the form of a dispersion thereof.

As mentioned above, the present invention can be adopted to multi-layer and multi-color photographic materials having at least two layers of different spectral sensitivities on a support. Multi-layer natural color photographic materials have, in general, at least one red-sensitive emulsion layer, at least one green-sensitive emulsion layer and at least one blue-sensitive emulsion layer on a support. The order of these layers to be provided on the support can be selected depending on the intended purpose of the photographic material. Each of the said emulsion layers may comprise two or more layers having different sensitive degrees, or a non light-sensitive layer may be provided between two or more layers having the same color-sensitivity.

The photographic light-sensitive materials of the present invention preferably have auxiliary layers such as a protective layer, intermediate layer, filter layer, antihalation layer, and backing layer, in addition to the silver halide emulsion layers, in need thereof.

Gelatin is advantageously used as the binder or protective colloid to be incorporated into the emulsion layer or intermediate layer of the photographic light-sensitive materials of the present invention; other hydrophilic colloids can also be used.

For instance, proteins such as gelatin derivatives, graft-polymers of gelatin and other high molecular substances, albumin, casein; cellulose derivatives such as hydroxyethyl cellulose, carboxymethyl cellulose, cellulose sulfates; saccharide derivatives such as sodium alginate, starch derivatives; mono- or co-polymers and the like various synthetic hydrophilic polymeric substances such as polyvinyl alcohol, partially acetallized alcohol, poly-N-vinylpyrrolidone, polyacrylic acid, polymethacrylic acid, polyacrylamide, polyvinyl imidazole, polyvinyl pyrazole, etc. can be used.

Gelatins which can be used in the present invention include lime-treated gelatin, acid-treated gelatin, and enzyme-treated gelatin as described in *Bull. Soc. Sci. Phot. Japan,* No. 16, page 30 (1966); and in addition, hydrolyzed or enzyme decomposition products of gelatin can also be used.

The photographic light-sensitive materials of the present invention can further contain, in addition to the above-mentioned additives, various kinds of stabilizers, stain-inhibitors, developers or precursors thereof, development accelerators or precursors thereof, lubricants, mordants, matting agents antistatics, plasticizers and other various kinds of additives which are useful for photographic light-sensitive materials.. Typical examples of these additives are described in *Research Disclosure,* RD Nos. 17643 (Dec. 1978) and 18716 (Nov. 1979).

The "reflective support" to be used in the present invention is one having an improved reflectivity, which has a function to improve the sharpness of the color image as formed in the silver halide emulsion layer; and examples of such reflective support include those as formed by coating a hydrophobic resin which contains a dispersion of a light-reflective substance such as titanium oxide, zinc oxide, calcium carbonate or calcium sulfate, on a support, or those made of a hydrophobic resin containing a dispersion of such light-reflective substance. For instance, baryta paper, polyethylene-coated paper, polypropylene-type synthetic paper as well as transparent supports on which a reflective layer has been provided or in which a reflective substance has been incorporated, such as a glass plate, polyethylene terephthalate, cellulose triacetate, cellulose nitrate and the like polyester films, and polyamide film, polycarbonate film and polystyrene film, can be used. These supports can properly be selected in accordance with the use and the object of the photographic material.

The average particle size of the silver halide particles in the emulsions to be used in the present invention, as represented by the diameter of the projected equivalent circle, is preferably from 0.1 μm to 2 μm, more preferably from 0.2 μm to 1.3 μm. The projected equivalent circle means a circle having the projected equivalent area of the silver halide particle. The silver halide emulsions are preferably mono-dispersed emulsions; and the particle size distribution of the emulsions, representing the degree of the mono-dispersion thereof, preferably has a ratio $(s/\bar{d})$ of 0.2 or less, more preferably 0.15 or less, where (s) is the statistical standard deviation and $(\bar{d})$ is the average particle diameter.

The silver halide emulsions which can be used in the present invention preferably comprise silver bromide and/or silver chlorobromide which do not substantially contain silver iodide; and in particular, silver chlorobromide emulsions which contain 2 mole% or more to 80 mole% or less, more preferably 2 mole% or more to less than 50 mole%, of silver chloride are especially preferred.

The silver halide particles to be used in the present invention may comprise different inner phase and surface layer phase, or may have a multi-phase constitution with conjunction structure, or may have a wholly uniform phase. Further, the present particles may comprise a combination of such structures.

The shape of the silver halide particles to be used in the present invention may be a cubic, octahedral, dodecahedral, tetradecahedral or the like regular crystal one, or may be a spherical or the like irregular crystal one, or otherwise, the present particles may comprise composite forms of these crystal shapes. Preferably, the present silver halide particles are regular crystals. Further, the present particles may be tabular ones, and in particular, an emulsion where 50% or more of the total projected area of the particles comprise tabular particles having an aspect ratio (length/thickness) of 5 or more (i.e., 5/1 or more), especially 8 or more, can be used in the present invention. An emulsion comprising a mixture of these various kinds of crystal forms can of course be used. These various kinds of emulsions may belong to either a surface-latent image-type where a latent image is formed essentially on the surface of the particles or an internal-latent image-type where a latent image is formed essentially in the inner part of the particles.

The photographic emulsions to be used in the present invention can be prepared by a variety of methods, for example, as described in P. Glafkides, *Chimie et Physique Photographique,* pages 329 to 425 (Paul Montel (1967)), G. F. Duffin, *Photographic Emulsion Chemistry,* pages 57 to 82 (Focal Press (1966)), and V. L. Zelikman et al, *Making and Coating Photographic Emulsion,* pages 69 to 87 (Focal Press (1964)). For instance, the present emulsions can be obtained by any method of an acidic method, a neutral method or an ammonia method; and for the reaction of a soluble silver salt and a soluble halide, a single jet method, a double jet method or a combination thereof can be utilized. A so-called reverse-mixing method where the particles are formed in the presence of excess silver ions can also be utilized. Further, a so-called controlled double-jet method which is one type of the said double jet method can also be utilized, where the pAg value in the liquid phase to form the silver halide particles is kept constant. According to this method, silver halide emulsions having a regular crystalline form and a nearly uniform particle size can be obtained.

In addition, emulsions as prepared by a conversion method comprising a step for converting the already formed silver halide particles into particles having a smaller solubility product during the procedure up to the completion of the formation of the silver halide particles, or emulsions as prepared by a method where the same halogen-conversion is applied to the already formed particles after the completion of the formation of the particles can also be used.

A cadmium salt, a zinc salt, a lead salt, a thallium salt, an iridium salt or a complex thereof, a rhodium salt or a complex thereof, an iron salt or a complex thereof or the like can exist in the step for the formation of the silver halide particles or the physical ripening thereof.

The silver halide particles are generally subjected to physical ripening, demineralIization or chemical ripening, after the formation thereof, and then coated on a support.

Known silver halide solvents (for example, ammonia, potassium thiocyanate or thioethers and thione compounds as described, e.g., in U.S. Pat. No. 3,271,157, Japanese Patent Application (OPI) Nos. 12360/76, 82408/78, 144319/78, 100717/79, and 155828/79) can be used in sedimentation, physical ripening, and chemical ripening. The removal of soluble silver salts from the physical-ripened emulsions can be carried out by noodle washing, flocculation or ultrafiltration method.

The silver halide emulsions to be used in the present invention can be sensitized by a sulfur-sensitization method where a sulfur-containing compound capable of reacting with an active gelatin or silver (for example, thiosulfates, thioureas, mercapto compounds, and rhodanines) is used; a reduction sensitization method where a reducing substance (for example, stannous salts, amines, hydrazine derivatives, formamidinesulfinic acid, silane compounds) is used; or a noble metal-sensitization method where a metal compound (for example, gold complexes as well as complexes of periodic table group VIII metals such as Pt, Ir, Pd, Rh, Fe) is used. Said sensitization methods can be utilized singly or in the form of a combination thereof.

Among these chemical-sensitization methods, the single sulfur-sensitization is more preferred.

In order to satisfy the desired gradation of the color photographic materials of the present invention, two or more mono-dispersed silver halide emulsions (where the mono-dispersed system preferably has the above-defined variation coefficient) having different particle size can be incorporated into the single layer as a mixture or they can be coated in a multilayer, in the formation of emulsion layers having a substantially same color-sensitivity. Further, two or more kinds of poly-dispersed silver halide emulsions or a combination of mono-dispersed emulsion and poly-dispersed emulsion can be used in mixture or separately in a multilayer.

Each of the blue-sensitive, green-sensitive and red-sensitive emulsions of the present invention is spectral-sensitized with methine dyes or the like other dyes so as to have the respective color-sensitivity. Usable dyes include cyanine dyes, merocyanine dyes, complex cyanine dyes, complex merocyanine dyes, holopolar-cyanine dyes, hemicyanine dyes, styryl dyes and hemioxonole dyes. Especially useful dyes are those belonging to cyanine dyes, merocyanine dyes, and complex merocyanine dyes. Any basic heterocyclic nucleus which may generally be contained in cyanine dyes may be applied to these dyes. For instance, such nuclei include pyrroline, oxazoline, thiazoline, pyrrole, oxazole, thiazole, selenazole, imidazole, tetrazole and pyridine nuclei, etc.; alicyclic hydrocarbon ring-fused heterocyclic nuclei; and aromatic hydrocarbon ring-fused heterocyclic nuclei such as indolenine, benzindolenine, indole, benzoxazole, naphthoxazole, benzothiazole, naphthothiazole, benzoselenazole, benzimidazole and quinoline nuclei, etc. These nuclei may be substituted on their carbon atoms.

Merocyanine dyes and complex merocyanine dyes may contain a 5- or 6-membered heterocyclic nuclei, such as pyrazolin-5-one, thiohydantoin, 2-thio-oxazolidine-2,4-dione, thiazolidine-2,4-dione, rhodanine, thiobarbituric acid nucleus and the like nuclei, as ketomethylene structure-containing nuclei.

These sensitizing dyes can be used singly or in te form of a mixture thereof, and the combination of the sensitizing dys is often utilized for the purpose of supersensitization. Typical examples thereof are described in U.S. Pat. Nos. 2,688,545, 2,977,229, 3,397,060, 3,522,052, 3,527,641, 3,617,293, 3,628,964, 3,666,480, 3,672,898, 3,679,428, 3,703,377, 3,769,301, 3,814,609, 3,837,862, and 4,026,707; British Pat. Nos. 1,344,281, 1,507,803; Japanese Patent Publication Nos. 4936/68 and 12375/78 and Japanese Patent Application (OPI) Nos. 110618/77 and 109925/77; etc.

Dyes which themselves have no spectral-sensitization activity or substances which do not substantially absorb visible rays but have a supersensitization activity can be incorporated into the emulsions together with the sensitizing dye.

In the practice of the present invention, the sensitizing dyes may be added to the silver halide photographic emulsions in any step before the emulsions are coated on the support.

For instance, the sensitizing dyes can be added to the emulsions in any step during or after the formation of the silver halide emulsion particles or before or after the chemical sensitization of the emulsions or during the step where additives are added for the preparation of the coating solutions.

In the case a mixture of mono-dispersed silver halide emulsions is to be used in the present invention, the sensitizing dye can previously be added to the separate emulsions, or alternatively, the sensitizing dye can be added to the mixture of the emulsions after the emulsions have been admixed. In particular, the former case where the sensitizing dye is previously added to the separate emulsions and then the emulsions are admixed is preferred.

Next, the photographic processing step (image-forming step) in the present invention will be mentioned hereunder.

In the color development step of the present invention, the processing time can be 2 minutes and 30 seconds or less, and virtually identical effects can be attained even in such short processing time as that attainable by a conventional 3 minute-processing. A more preferred processing time in the color development of the present invention is from 1 minute to 2 minutes and 10 seconds. The processing time means the time from the first contact of the photographic material to be processed with the color developer to the first contact of the said material with the next bath, including the time for the transference of the material between the baths.

The color developer to be used in the development of the present invention is preferably an alkaline aqueous solution mainly comprising an aromatic primary amine-type color-developing agent. P-phenylenediamine-type compounds are preferably used as the color-developing agent, and typical examples thereof are 3-methyl-4-amino-N,N-diethylaniline, 3-methyl-4-amino-N-ethyl-N- -hydroxyethylaniline, 3-methyl-4-amino-N-ethyl-N-$\beta$-methanesulfonamidoethylaninline, 3-ethyl-4-amino-N-ethyl-N-$\beta$-methoxyethylaniline and sulfates, hydrochlorides, phosphates, p-toluenesulfonates, tetraphenylborates and p-(t-octyl)benzenesulfonates thereof.

Aminophenol-type derivatives include, for example, o-aminophenol, p-aminophenol, 4-amino-2-methylphenol, 2-amino-3-methylphenol, 2-oxy-3-amino-1,4-dimethylbenzene, etc.

In addition, compounds as described in L. F. A. Mason, *Photographic Processing Chemistry,* pp. 226–229 (Focal Press (1966)); U.S. Pat. Nos. 2,193,015 and 2,592,364; and Japanese Patent Application (OPI) No. 64933/73 can also be used. If desired, two or more color-developing agents can be used in combination.

The processing temperature of the color developer of the present invention is preferably from 30° to 50° C., and more preferably, 35° to 45° C.

As the development accelerator, any compounds can be used so far as these do not substantially contain benzyl alcohol. For instance, various kinds of pyridinium compounds and other cationic compounds, cationic dyes such as phenosafranine, neutral salts such as thallium nitrate and potassium nitrate, as described in U.S. Pat. No. 2,648,604, Japanese Patent Publication No. 9503/69 and U.S. Pat. No. 3,171,247; nonionic compounds such as polyethylene glycol and derivatives thereof and polythioethers, as described in Japanese Patent Publication No. 9304/69, U.S. Pat. Nos. 2,533,990, 2,531,832, 2,950,970 and 2,577,127; thioether-type compounds as described in U.S. Pat. No. 3,201,242; and compounds as described in Japanese Patent Application (OPI) Nos. 156934/83 and 220344/85 can be mentioned.

In the short time development of the present invention, not only the means for the acceleration of the development, but also the technique for the prevention of the development fog is an important subject. As the fog-inhibitor in the present invention are preferably alkali metal halides such as potassium bromide, sodium bromide, and potassium iodide and organic fog-inhibitors. Examples of usable organic fog-inhibitors are nitrogen-containing heterocyclic compounds such as benzotriazole, 6-nitrobenzimidazole, 5-nitrosoindazole, 5-methylbenzotriazole, 5-nitrobenzotriazole, 5-chlorobenzotriazole, 2-thiazolyl-benzimidazole, 2-thiazolylmethyl-benzimidazole, hydroxyazaindolidine; mercapto-substituted heterocyclic compounds such as 1-phenyl-5-mercapto-tetrazole, 2-mercaptobenzimidazole, 2-mercaptobenzothiazole; and additionally, mercapto-substituted aromatic compounds such as thiosalicylic acid. In particular, halides are espeically preferred. The fog-inhibitor can be dissolved out from the color photographic material, while the material is being processed, to be deposited in the color developer solution.

The color developer of the present invention may further contain a pH-buffer such as alkali metal carbonates, borates, or phosphates; a preservative such as hydroxylamines, triethanol amines, compounds as described in West German Patent Application (OLS) No. 2,622,950, sulfites or bisulfites; an organic solvent such as diethylene glycol; a dye-forming coupler; a competing coupler; a nucleating agent such as sodium boronhydride; an auxiliary developing agent such as 1-phenyl-3-pyrazolidone; a tackifier; and a chelating agent such as amino-polycarboxylic acids, e.g., ethylenediamine-tetraacetic acid, nitrilo-triacetic acids, cyclohexanediamine-tetraacetic acid, imino-diacetic acid, N-hydroxymethylethylenediamine-triacetic acid, diethylenetriamine-pentaacetic acid, triethylenetetramine-hexaacetic acid and compounds as described in Japanese Patent Application (OPI) No. 195845/83, 1-hydroxyethylidene-1,1'-diphosphonic acid, organic phosphonic acids as described in *Research Disclosure,* RD No. 18170 (May, 1979), aminophosphonic acids, e.g., aminotris(-methylenephosphonic acid) and ethylenediamine-N,N,N',N'-tetramethylene-phosphonic acid and phosphonocarboxylic acids as described in Japanese Patent Application (OPI) Nos. 102726/77, 42730/78, 121127/79, 4023/80, 4025/80, 126241/80, 65955/80 and 65956/80, and *Research Disclosure,* RD No. 18170 (May, 1979).

If desired, the color development stage may be divided into two or more parts and a color development replenisher can be replenished in the first bath or in the last bath, whereby the development time can be reduced and the amount of the replenisher may be reduced.

The silver halide color photographic materials are, after having been color-developed, generally bleached. The bleaching can be carried out simultaneously with fixation (bleaching-fixation) of alternatively, separately therefrom. As the bleaching agent can be used, for example, compounds of polyvalent metals such as iron (III), cobalt (III), chromium (VI) or copper (II), peracids, quinones and nitroso compounds. For instance, ferricyanides, bichromates, organic complexes with iron (III) or cobalt (III) such as complexes of ethylenediamine-tetraacetic acid, diethylenetriamine-pentaacetic acid, nitrilotriacetic acid, 1,3-diamino-2-propanol-tetraacetic acid or the like amino-polycarboxylic acid or with citric acid, tartaric acid, malic acid or the like organic acid; persulfates, manganates; and nitrosophenol can be used. In particular, potassium ferricyanide, sodium ethylenediamine-tetraacetato iron (III), ammonium ethylenediamine-tetraacetato iron (III), ammonium triethylenetetramine-pentaacetato iron (III) and persulfates are especially preferred. Ethylenediamine-tetraacetato iron (III) complexes are usable both in an independent bleaching solution and in a combined bleaching-fixation solution.

The bleaching solution and the bleaching-fixation solution may contain, if desired, various kinds of accelerators. For instance, bromide ion, iodide ion, as well as thiourea-type compounds as described in U.S. Pat. No. 3,706,561, Japanese Patent Publication Nos. 8506/70 and 26586/74, and Japanese Patent Application (OPI) Nos. 32735/78, 36233/78 and 37016/78; thiol-type compounds as described in Japanese Patent Application (OPI) Nos. 124424/78, 95631/78, 57831/78, 32736/78, 65732/78 and 52534/79 and U.S. Pat. No. 3,893,858; heterocyclic compounds as described in Japanese Patent Application (OPI) Nos. 59644/74, 140129/75, 28426/78, 141623/78, 104232/78 and 35727/79; thioether-type compound as described in Japanese Patent Application (OPI) Nos. 20832/77, 25064/80 and 26506/80; quaternary amines as described in Japanese Patent Application (OPI) No. 84440/73; and thiocarbamoyl-type compounds as described in Japanese Patent Application (OPI) No. 42349/74 can be used.

As the fixing agents can be mentioned thiosulfates, thiocyanates, thioether-type compounds, thioureas and a large amount of iodides. In particular, thiosulfates are generally used. As the preservative for the bleaching-fixation solution or the fixation solution, sulfites or bisulfites or carbonyl-bisulfite adducts are preferred.

After the bleaching-fixation or the fixation, the photographic materials are generally washed. In the washing step, various kinds of known compounds can be used for the purpose of the prevention of precipitation or of the economization of water. For instance, a water-softener such as inorganic phosphoric acids, amino-polycarboxylic acids or organic phosphoric acids; a bactericide or fungicide for the prevention of growth of various bacteria, algae or fungi; a hardener such as magnesium salt or aluminum salt; a surfactant for the prevention of drying load or unevenness, etc., can be added if there is a need therefor. As the case may be, compounds as described in L. E. West, *Photographic Science and Engineering,* Vol. 9, No. 6 (1965) can be added. In particular, the addition of the chelating agent or fungicide is effective. A multi-stage countercurrent flow system (for example, comprising 2 to 5 stages) can be applied to the washing step for the purpose of the economization of water.

After the washing step or in place of the said step, the photographic material may be subjected to multi-stage countercurrent stabilization processing system as described in Japanese Patent Application (OPI) No. 8543/82. The stabilization step requires a countercurrent-system bath line comprising 2 to 9 baths. Various kinds of compounds are added to the stabilization baths for the stabilization of images. For instance, a film pH-regulating buffer (such as borates, metaborates, borax, phosphates, carbonates, potassium hydroxide, sodium hydroxide, aqueous ammonia, mono-carboxylic acids, dicarboxylic acids, poly-carboxylic acids, etc.) and formalin can be added. In addition, a water-softener (such as inorganic phosphoric acids, aminopolycarboxylic acids, organic phosphoric acids, aminopolyphosphoric acids, phosphono-carboxylic acids, etc.), a bactericide (such as Proxel, isothiazolone, 4-thiazolylbenzimidazoles, halogenated phenol-benzotriazoles, etc.), surfactant, a brightening agent, a hardener, etc. can further be added in need thereof.

Various kinds of ammonium salts such as ammonium chloride, ammonium nitrate, ammonium sulfate, ammonium phosphate, ammonium sulfite or ammonium thiosulfate can be added as a film pH-regulator for regulating pH value of the film after processed.

The present invention will be explained in greater detail by reference to the following examples, which, however, are not intended to be interpreted as limiting the scope of the present invention.

EXAMPLE 1

The following layers were coated on a polyethylene-coated paper in order from the side of the support to obtain 8 kinds of silver halide color photographic materials. Each coating solution was prepared as follows:

Preparation of first layer-coating solution 19.1 g of yellow coupler (Y-35), 27.2 ml of ethyl acetate and 7.9 ml of solvent (*) were blended and dissolved, while being stirred under heat, and the resulting solution was emulsified and dispersed in 185 ml of 10% gelatin-aqueous solution containing 8 ml of 10% sodium dodecylbenzenesulfonate. On the other hand, the following blue-sensitive sensitizing dye was added to a silver chlorobromide emulsion (containing 80 mole% of silver bromide and 70 g/kg of Ag), in an amount of $7.0\times10^{-4}$ mole per mole of the silver chlorobromide, to obtain 90 g of a blue-sensitive emulsion. The emulsified dispersion and the emulsion were blended and dissolved, and gelatin was added thereto while the gelatin concentration was regulated as mentioned below, to obtain a first layer-coating solution.

| | |
|---|---|
| Composition of first layer: | |
| Silver chlorobromide emulsion | 0.30 g (silver)/$m^2$ |
| Gelatin | 1.86 g/$m^2$ |
| Yellow coupler (Y-35) | 0.82 g/$m^2$ |
| Solvent | 0.34 g/$m^2$ |

Solvent (*)

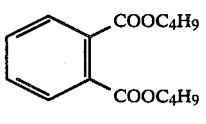

Blue-sensitive sensitizing dye:

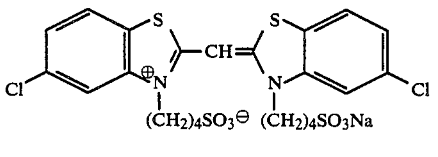

| | |
|---|---|
| Second layer: | |
| Gelatin | 1.33 g/$m^2$ |

A gelatin hardener of sodium 1-oxy-3,5-dichloro-s-triazine was added to each layer.

The color print material thus obtained was called sample (A).

Next, in the same manner as the sample (A) with the exception that the compound of the present invention (as shown in the following Table-1) was added to the first layer in an amount of 60 mole% of the coupler therein, other color print materials (samples (B) through (H)) were formed.

These samples were subjected to gradation exposure for sensitometry with a sensitometer (FWH-type, by Fuji Photo Film Co., Ltd.; color temperature of light source: 3200 K.) through a blue filter. The exposure time was 0.5 second, and the exposure amount was 250 CMS.

Afterwards, the samples were processed with the color developers (I) and (II) as mentioned below.

The photographic process comprised the steps of color development, bleaching-fixation and washing, and after the processing, the photographic characteristics of each same were evaluated.

In the photographic process, all the samples were treated in the same manner except the difference in the treatment with the color developer (I) and the color developer (II).

The evaluation of the photographic characteristics of the processed samples was made on two items of the relative sensitivity and the maximum density (Dmax).

The relative sensitivity was represented by a relative value on the basis of the index value (100) of the sensitivity of the sample (A) as processed with the developer (I). The sensitivity was designated by the relative value of the reciprocal of the exposure amount as required for obtaining the density comprising the minimum density plus 0.5.

| Processing step | Temperature | Time |
|---|---|---|
| Development | 38° C. | 2.0 min. |
| Bleaching-fixation | 33° C. | 1.5 min. |
| Washing with water | 28 to 35° C. | 3.0 min. |

Composition of Developer

| Color Developer (I): | |
|---|---|
| Pentasodium-diethylenetriamine-pentaacetate | 2.0 g |
| Benzyl alcohol | 15 ml |
| Diethylene glycol | 10 ml |
| $Na_2SO_3$ | 2.0 g |
| KBr | 0.5 g |
| Hydroxylamine sulfate | 3.0 g |
| 4-Amino-3-methyl-N—ethyl-N—[β-(methane-sulfonamido)ethyl]-p-phenylenediamine sulfate | 5.0 g |
| $Na_2CO_3$ (mono-hydrate) | 30.0 g |
| Brightening agent (stilbene-type) | 1.0 g |
| Water to make | 1000 ml |
| | (pH 10.1) |

| Color Developer (II): | |
|---|---|
| Pentasodium-diethylenetriamine-pentaacetate | 2.0 g |
| $Na_2SO_3$ | 2.0 g |
| KBr | 0.5 g |
| Hydroxylamine sulfate | 3.0 g |
| 4-Amino-3-methyl-N—ethyl-N—[β-(methane- | 5.0 g |

-continued

| Color Developer (II): | |
|---|---|
| sulfonamido)ethyl]-p-phenylenediamine sulfate | |
| $Na_2CO_3$ (mono-hydrate) | 30.0 g |
| Brightening agent (stilbene-type) | 1.0 g |
| Water to make | 1000 ml |
| | (pH 10.1) |

| Composition of Bleaching-fixation Solution: | |
|---|---|
| Ammonium thiosulfate (54 wt %) | 150 ml |
| $Na_2SO_3$ | 15 g |
| $NH_4[Fe(III)(EDTA)]$ | 55 g |
| EDTA.2Na | 4 g |
| Water to make | 1000 ml |
| | (pH 6.9) |

The reflection density of each sample was measured with a blue monochromatic light, and the results as shown in the following Table-1 were obtained from the characteristic curve.

TABLE 1

| Sample | Non-coloring compound (*) | Relative Sensitivity Color Developer (I) | (II) | Dmax Color Developer (I) | (II) |
|---|---|---|---|---|---|
| A (Comparison) | — | 100 | 63 | 2.30 | 1.60 |
| B (Invention) | I - 1 | 100 | 98 | 2.32 | 2.28 |
| C (Invention) | II - 5 | 101 | 85 | 2.33 | 2.10 |
| D (Invention) | III - 2 | 100 | 93 | 2.30 | 2.22 |
| E (Invention) | IV - 4 | 100 | 95 | 2.29 | 2.25 |
| F (Invention) | V - 3 | 100 | 80 | 2.32 | 2.05 |
| G (Invention) | VI - 2 | 99 | 81 | 2.30 | 2.03 |
| H (Invention) | VII - 6 | 100 | 89 | 2.32 | 2.15 |

(*) Non-coloring compound of the invention as added to the first layer.

The results as shown in the Table-1 prove that the addition of the coloration accelerator of the present invention is effective even in the short time treatment with the color developer containing no benzyl alcohol, resulting in the achievement of the excellent coloring acceleration in the samples containing the coloration accelerator.

On the contrary, it is noted that the sample (A) which did not contain the coloring accelerator of the present invention, did not satisfy the object of the present invention, since the colored density was low when this was treated with the color developer containing no benzyl alcohol.

EXAMPLE 2

Plural layers were applied to a polyethylene-coated paper support, to obtain a multi-layer color photographic paper having the layer constitution as shown in the following Table-2.

The color print material thus obtained was called sample (I).

Spectral sensitizing dyes as used in each emulsion were as follows:

Blue-sensitive emulsion layer:

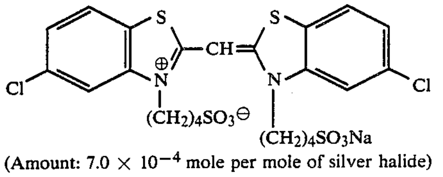

(Amount: $7.0 \times 10^{-4}$ mole per mole of silver halide)

Green-sensitive emulsion layer:

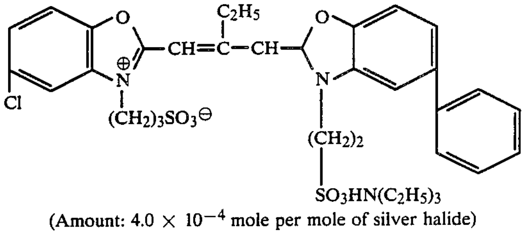

(Amount: $4.0 \times 10^{-4}$ mole per mole of silver halide)

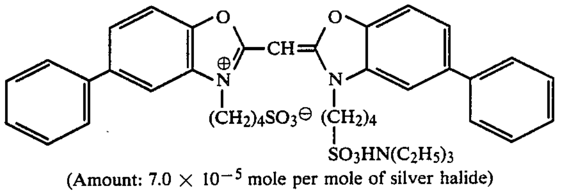

(Amount: $7.0 \times 10^{-5}$ mole per mole of silver halide)

Red-sensitive emulsion layer:

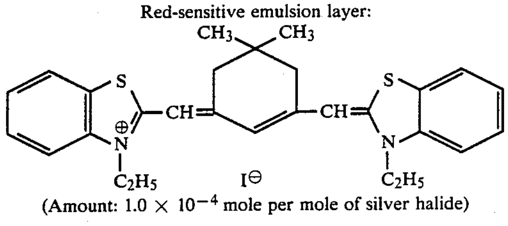

(Amount: $1.0 \times 10^{-4}$ mole per mole of silver halide)

The following dyes were used as the anti-irradiation dye in each emulsion layer.

Green-sensitive emulsion layer:

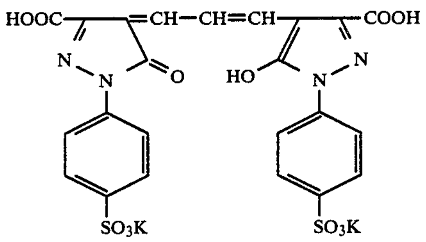

Red-sensitive emulsion layer:

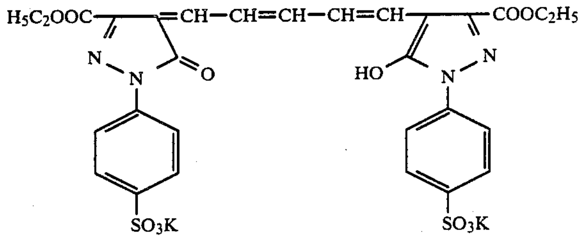

Other compounds as used in this example each have the following structural formulae:

(a) Color image-stabilizer:

-continued

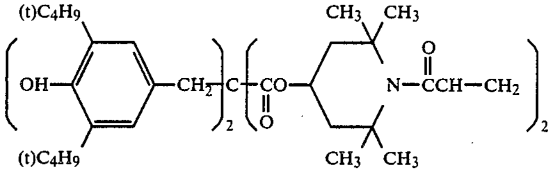

(b) Solvent

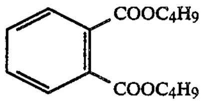

(c) Color stain-inhibitor:

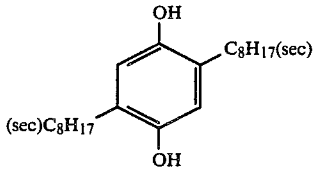

(d) Color image-stabilizer:

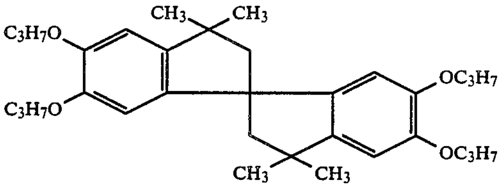

(e) Solvent
Mixture (2/1, by weight) of $(C_8H_{17}O)_3$—P=O and 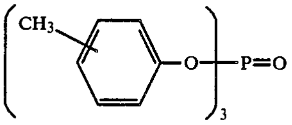

(f) UV-absorbent:
Mixture (1/5/3, by molar ratio) of the following compounds:

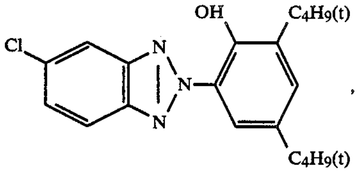

,

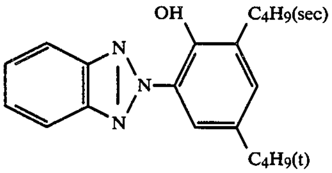

and

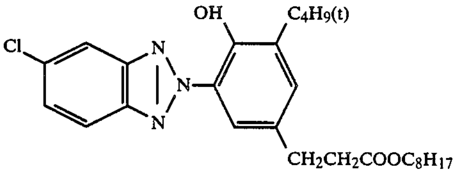

(g) Color stain-inhibitor:

-continued

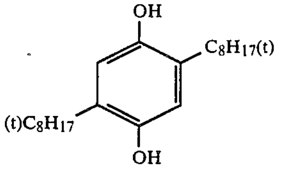

(h) Solvent:

$(iso\ C_9H_{18}O)_3P=O$ (i) Color image-stabilizer:
Mixture ($i_1/i_2/i_3$ = 1/3/3 by molar ratio) of the following compounds:

($i_1$)

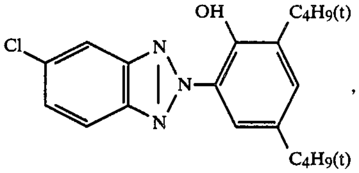

, ($i_2$)

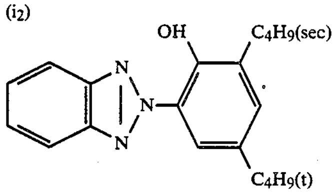

and ($i_3$)

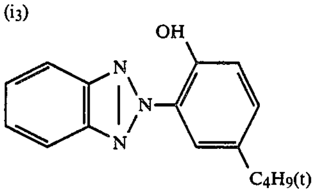

(j) Solvent:

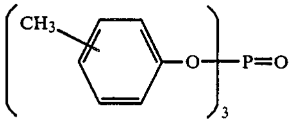

TABLE 2

| Layer | Main Composition | Amount |
|---|---|---|
| 7th Layer (Protective layer) | Gelatin | 1.33 g/m$^2$ |
| | Acryl-denaturated copolymer of polyvinyl alcohol (denaturated degree: 17%) | 0.17 g/m$^2$ |
| 6th Layer (UV-absorbent layer) | Gelatin | 0.54 g/m$^2$ |
| | UV-absorbent (f) | 0.21 g/m$^2$ |
| | Solvent (h) | 0.09 cc/m$^2$ |
| 5th Layer (Red-sensitive layer) | Silver chlorobromide emulsion (silver bromide: 70 mole %) | 0.26 g (silver)/m$^2$ |
| | Gelatin | 0.98 g/m$^2$ |
| | Cyan coupler (mixture of C-2 and C-1 of 1/1, by molar ratio) | 0.38 g/m$^2$ |
| | Color image-stabilizer (i) | 0.17 g/m$^2$ |
| | Solvent (j) | 0.23 cc/m$^2$ |
| 4th Layer (UV-absorbent layer) | Gelatin | 1.60 g/m$^2$ |
| | UV-absorbent (f) | 0.62 g/m$^2$ |
| | Color stain-inhibitor (g) | 0.05 g/m$^2$ |
| | Solvent (h) | 0.26 cc/m$^2$ |
| 3rd Layer | Silver chlorobromide emul- | 0.16 g (silver)/m$^2$ |

TABLE 2-continued

| Layer | Main Composition | Amount |
|---|---|---|
| (Green-sensitive layer) | sion (silver bromide: 75 mole %) | |
| | Gelatin | 1.80 g/$m^2$ |
| | Magenta coupler (M-23) | 0.34 g/$m^2$ |
| | Color image stabilizer (d) | 0.20 g/$m^2$ |
| | Solvent (e) | 0.68 cc/$m^2$ |
| 2nd Layer (Color-stain inhibitor layer) | Gelatin | 0.99 g/$m^2$ |
| | Color stain-inhibitor (c) | 0.08 g/$m^2$ |
| 1st Layer (Blue-sensitive layer) | Silver chlorobromide emulsion (silver bromide: 80 mole %) | 0.30 g (silver)/$m^2$ |
| | Gelatin | 1.86 g/$m^2$ |
| | Yellow coupler (Y-23) | 0.91 g/$m^2$ |
| | Color image-stabilizer (a) | 0.19 g/$m^2$ |
| | Solvent (b) | 0.36 cc/$m^2$ |
| Support | Polyethylene-laminated paper containing white pigment ($TiO_2$) and blueish dye (ultramarine) in polyethylene of 1st layer side. | |

In the same manner as sample (I), with the exception that the compound (I-1) of the present invention was added to the 1st layer, 3rd layer, and 5th layer each in an amount of 60 mole% of the coupler, another color print sample (J) was formed.

These samples were subjected to gradation exposure for sensitometry with a sensitometer (FWH-type, by Fuji Photo Film Co., Ltd.; color temperature of light source: 3200 K.) through red, green and blue filters. The exposure time was 0.5 second and the exposure amount was 250 CMS.

Afterwards, the samples were processed in the same manner as the Example 1, using the color developers (I) and (II). The results are set forth in the following Table-3.

In the Table-1, B, G, and R each shows the results of the measurement of the density as measured with the respective monochromatic light of blue, green, and red lights.

TABLE 3

| Sample | | Relative sensitivity Color developer (I) | Relative sensitivity Color developer (II) | Dmax Color developer (I) | Dmax Color developer (II) |
|---|---|---|---|---|---|
| I | B | 100 | 72 | 2.30 | 1.73 |
| (Comparison) | G | 100 | 75 | 2.48 | 1.90 |
| | R | 100 | 61 | 2.59 | 2.04 |
| J | B | 102 | 97 | 2.32 | 2.27 |
| (Invention) | G | 100 | 98 | 2.48 | 2.41 |
| | R | 100 | 93 | 2.61 | 2.44 |

The results of the Table-3 show that the color print material sample (J) of the present invention is better than the comparative sample (I), in that the decrement of the sensitivity was smaller and a better coloration of deep density could be attained even when this was processed with the color developer (II) containing no benzyl alcohol for a short period of time.

While the invention has been described in detail and with reference to specific embodiments thereof, it will be apparent to one skilled in the art that various changes and modifications can be made therein without departing from the spirit and scope thereof.

What is claimed is:

1. A method for the formation of a color image wherein a silver halide color photographic material comprising a photographic layer provided on a reflective support is imagewise exposed and then subjected to development for a period of time within 2 minutes and 30 seconds with a color developer which contains am aromatic primary amine developing agent but containing benzyl alcohol in an amount of 0.5 m/l or less, wherein said photographic layer contains at least one non-coloring compound selected from the group consisting of compounds represented by formulae (I), (III) and (IV).

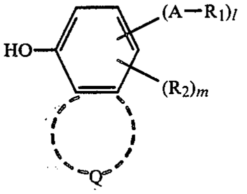

(I)

$$Y_1-O-(R_4'-O)_n-R_4 \quad (III)$$

$$R_5-NHSO_2-R_6 \quad (IV)$$

wherein

A represents a divalent electron attractive group; $R_1$ represents a substituted or unsubstituted alkyl group, a substituted or unsubstituted aryl group, a substituted or unsubstituted alkoxy group, a substituted or unsubstituted aryloxy group, a substituted or unsubstituted alkylamino group, a substituted or unsubstituted anilino group or a substituted or unsubstituted heterocyclic group; l represents an integer of 1 or 2; $R_2$ represents a substituted or unsubstituted alkyl group, a substituted or unsubstituted alkoxy group, a hydroxyl group or a halogen atom; m represents an integer of 1 to 4; Q represents a benzene ring or hetero ring which may be condensed with the phenol ring in the formula;

$Y_1$ represents a substituted or unsubstituted aryl group, a substituted or unsubstituted alkyl group, a substituted or unsubstituted heterocyclic group, or

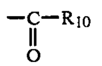

wherein $R_{10}$ represents a substituted or unsubstituted alkyl group, a substituted or unsubstituted aryl group, a substituted or unsubstituted amino group, a substituted or unsubstituted alkoxy group or a substituted or unsubstituted aryloxy group; $R_4'$ represents a substituted or unsubstituted alkylene group, a substituted or unsubstituted arylene group or a substituted or unsubstituted aralkylene group; $R_4$ represents a substituted or unsubstituted alkyl group or substituted or unsubstituted aryl group; provided that $Y_1$ and $R_4$ are not both alkyl groups;

n represents an integer of 1 to 5;

$R_5$ represents a substituted or unsubstituted alkyl group, a substituted or unsubstituted aryl group, a substituted or unsubstituted alkyl or arylsulfonyl group or a substituted or unsubstituted acyl group; $R_6$ represents the same substituent as $R_4$; or $R_5$ and $R_6$ together represent a 5- or 7-membered ring.

2. A method for the formation of a color image as in claim 1, wherein said photographic layer contains a non-coloring compound represented by formula (I).

3. A method for the formation of a color image as in claim 1, wherein said non-coloring compound is co-dispersed together with an oil-soluble coupler.

4. A method for the formation of a color image as in claim 1, wherein said non-coloring compound is co-dispersed together with an oil-soluble coupler.

5. A method for the formation of a color image as in claim 2, wherein said non-coloring compound is co-dispersed together with an oil-soluble coupler.

6. A method for the formation of a color image as in claim 3, wherein said non-coloring compound is used in an amount of from 20 to 300 mol% with respect to the amount of the oil-soluble coupler.

7. A method for the formation of a color image as in claim 4, wherein said non-coloring compound is used in an amount of from 20 to 300 mol% with respect to the amount of the oil-soluble coupler.

8. A method for the formation of a color image as in claim 6, wherein said non-coloring compound is used in an amount of from 20 to 300 mol% with respect to the amount of the oil-soluble coupler.

9. A method for the formation of a color image as in claim 3, wherein said non-coloring compound is used in an amount of from 40 to 150 mol% with respect to the amount of the oil-soluble coupler.

10. A method for the formation of a color image as in claim 4, wherein said non-coloring compound is used in an amount of from 40 to 150 mol% with respect to the amount of the oil-soluble coupler.

11. A method for the formation of a color image as in claim 5, wherein said non-coloring compound is used in an amount of from 40 to 150 mol% with respect to the amount of the oil-soluble coupler.

12. A method for the formation of a color image as in claim 3, wherein the oil-soluble coupler is at least one coupler selected from the group consisting of compounds represented by formulae (A) through (E)

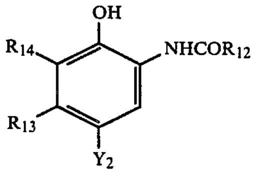
(A)

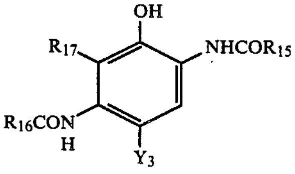
(B)

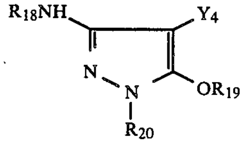
(C)

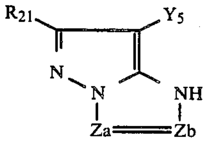
(D)

-continued

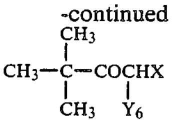
(E)

wherein $R_{12}$, $R_{15}$, and $R_{16}$ each represents an aliphatic group, an aromatic group, a heterocyclic group, an aromatic amino group, or a heterocyclic amino group; $R_{13}$ represents an aliphatic group; $R_{14}$ and $R_{17}$ each represents a hydrogen atom, a halogen atom, an aliphatic group, an aliphaticoxy group, or an acylamino group;

$R_{18}$ and $R_{20}$ each represents a substituted or unsubstituted phenyl group; $R_{19}$ represents a hydrogen atom, an aliphatic or aromatic acyl group, or an aliphatic or aromatic sulfonyl group;

$R_{21}$ represents a hydrogen atom, an aliphatic group, an aromatic group, a heterocyclic group, an aliphatic oxy group, an acylamino group, an aromatic amino group, an ureido group, an aliphatic thio group, an aromatic thio group, an alkoxycarbonylamino group, a sulfonamido group, an carbamoyl group, a sulfamoyl group, an aliphatic sulfonyl group, an aromatic sulfonyl group, an aliphatic or aromatic acyl group, or an alkoxycarbonyl group;

X represents a substituted or unsubstituted N-phenylcarbamoyl group; Za and Zb each represents a methine group, a substituted methine group, or =N—;

$Y_2$, $Y_3$, and $Y_5$ each represents a halogen atom or a group capable of being removed in the coupling reactin with an oxidation product of a developing agent;

$Y_4$ represents a hydrogen atom or a coupling off group;

$Y_6$ represents a coupling off group;

or $R_{13}$ and $R_{14}$, and $R_{16}$ and $R_{17}$in the formulae (A) and (B), respectively, form a 5-, 6-, or 7-membered ring;

or $R_{13}$ and $R_{14}$, and $R_{16}$ and $R_{17}$, in the formulae (A) and (B), respectively, form a 5-, 6-, or 7-membered ring;

or $R_{12}$, $R_{13}$, $R_{14}$, or $Y_2$; $R_{15}$, $R_{16}$, $R_{17}$, or $Y_3$; $R_{18}$, $R_{19}$, $R_{20}$, or $Y_4$; $R_{21}$, Za, and Zb, or $Y_5$; and X or $Y_6$ form a dimer or higher polymer.

13. A method for the formation of a color image as in claim 12, wherein said non-coloring compound is used in an amount of from 20 to 300 mol% with respect to the amount of the oil-soluble coupler.

14. A method for the formation of a color image as in claim 1, wherein the silver halide color photographic material is subjected to development for a period of time of from 1 minute to 2 minutes and 10 seconds.

15. A method for the formation of a color image as in claim 3, wherein the silver halide color photographic material is subjected to development for a period of time of from 1 minute to 2 minutes and 10 seconds.

16. A method for the formation of a color image as in claim 5, wherein the silver halide color photographic material is subjected to development for a period of time of from 1 minute to 2 minutes and 10 seconds.

17. A method for the formation of a color image as in claim 1, wherein the silver halide color photographic material is subjected to said development at a temperature of from 30° to 50° C.

18. A method for the formation of a color image as in claim 3, wherein said silver halide color photographic material is subjected to said development at a temperature of from 35° to 45° C.

* * * * *